(12) United States Patent
Lewis

(10) Patent No.: US 6,431,378 B1
(45) Date of Patent: *Aug. 13, 2002

(54) PUSH-BACK STORAGE RACK

(76) Inventor: Lyman F. Lewis, 9700 Homerich, Byron Center, MI (US) 49315

( * ) Notice: Subject to any disclaimer, the term of this patent is extended or adjusted under 35 U.S.C. 154(b) by 0 days.

This patent is subject to a terminal disclaimer.

(21) Appl. No.: 09/367,408

(22) PCT Filed: Dec. 12, 1997

(86) PCT No.: PCT/US97/23023

§ 371 (c)(1),
(2), (4) Date: Mar. 14, 2000

(87) PCT Pub. No.: WO99/30596

PCT Pub. Date: Jun. 24, 1999

Related U.S. Application Data

(63) Continuation-in-part of application No. 08/388,634, filed on Feb. 14, 1995, now Pat. No. 6,112,915.

(51) Int. Cl.⁷ .................................................. A47F 5/00
(52) U.S. Cl. ...................... 211/151; 211/59.2; 414/276; 414/286
(58) Field of Search .................. 211/151, 59.2, 211/162; 414/286, 276

(56) References Cited

U.S. PATENT DOCUMENTS

| | | | |
|---|---|---|---|
| 1,026,617 A | * | 5/1912 | Turnbull |
| 4,662,511 A | | 5/1987 | Greener |
| 4,825,999 A | * | 5/1989 | Hammer |
| 5,538,384 A | * | 7/1996 | Haldimann |
| 5,638,965 A | * | 6/1997 | Mattingly et al. .......... 211/151 |
| 5,944,202 A | * | 8/1999 | Wylie .......................... 211/151 |
| 6,112,915 A | | 9/2000 | Lewis .......................... 211/151 |

* cited by examiner

Primary Examiner—Robert W. Gibson, Jr.
(74) Attorney, Agent, or Firm—Waters & Morse, P.C.

(57) ABSTRACT

A push-back storage rack comprises a frame defining at least one storage bay having a depth sufficient to accommodate a plurality of separate storage units; and a track-mounted carriage assembly mounted in the bay. The carriage assembly comprises at least two articulated carts connected together end-to-end for pivotal movement about a transverse horizontal axis. The carts ride on a track that has an upper track section, a lower track section, and an arcuate front section that joins the upper and lower track sections. The track guides the carts for movement between the front and the rear of the bay on the upper track section and directs the carts downwardly and then rearwardly on the lower track section in an inverted position as the carts move forwardly at the front end of the upper track section. The carts are thus stored underneath the upper track section and are brought upwardly to the upper track section as the carts are filled and moved rearwardly in the upper track section.

22 Claims, 24 Drawing Sheets

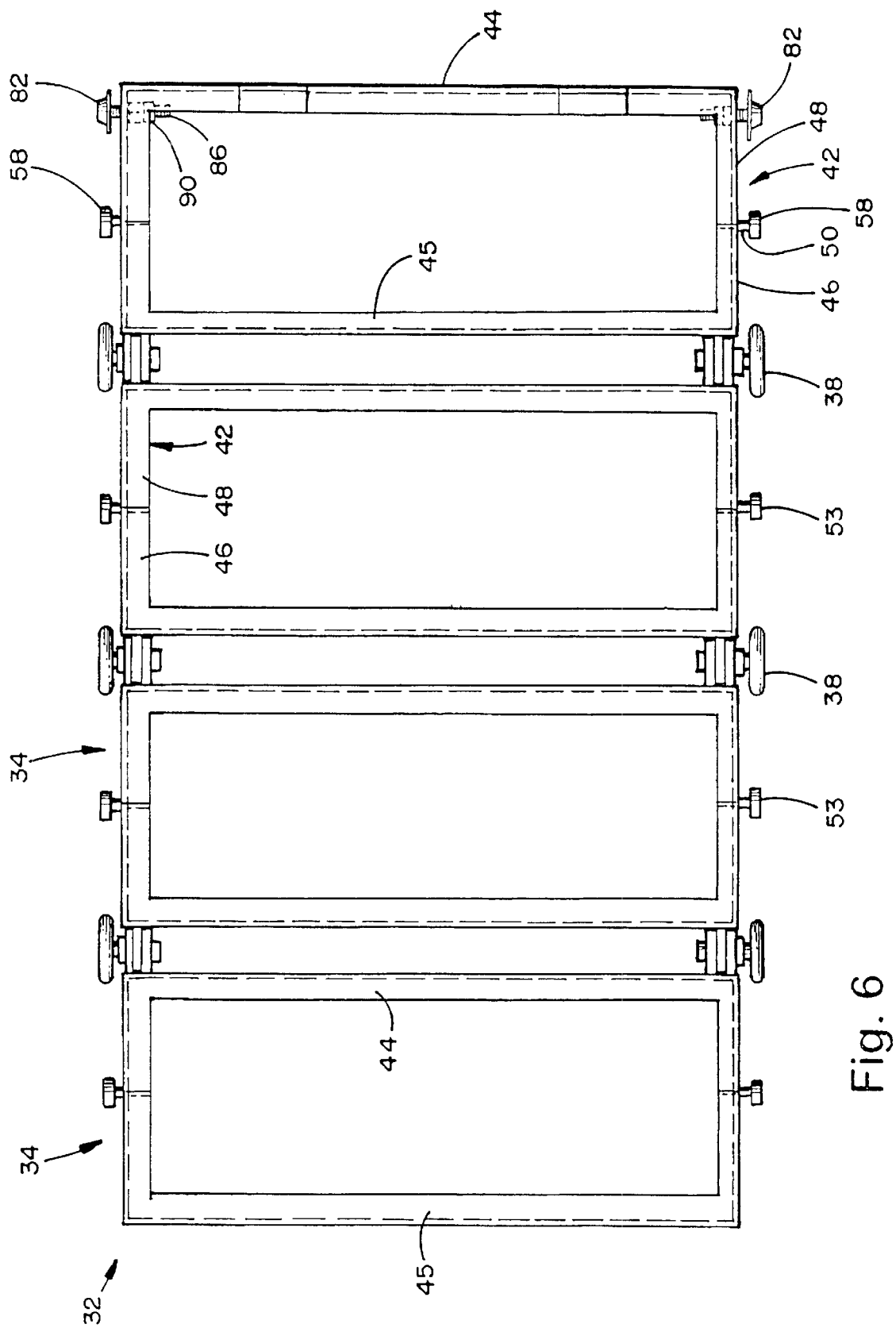

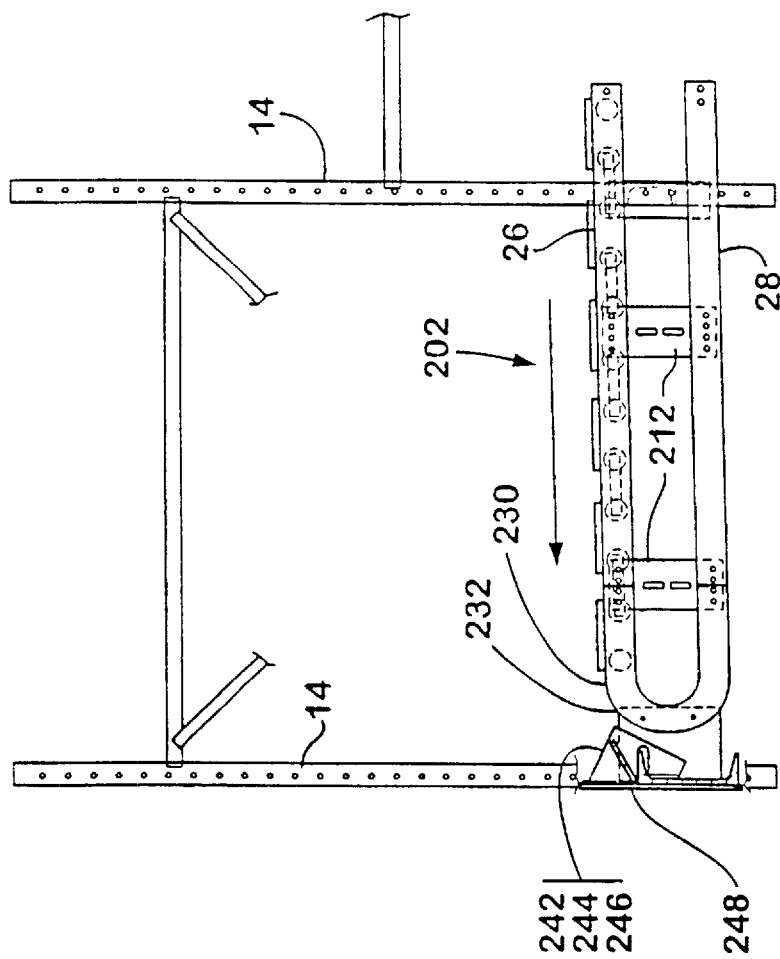
Fig. 32
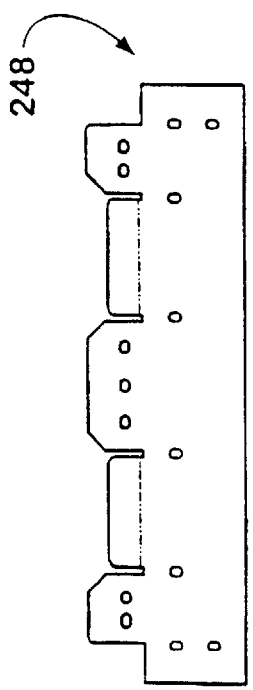
Fig. 30
Fig. 29
Fig. 28

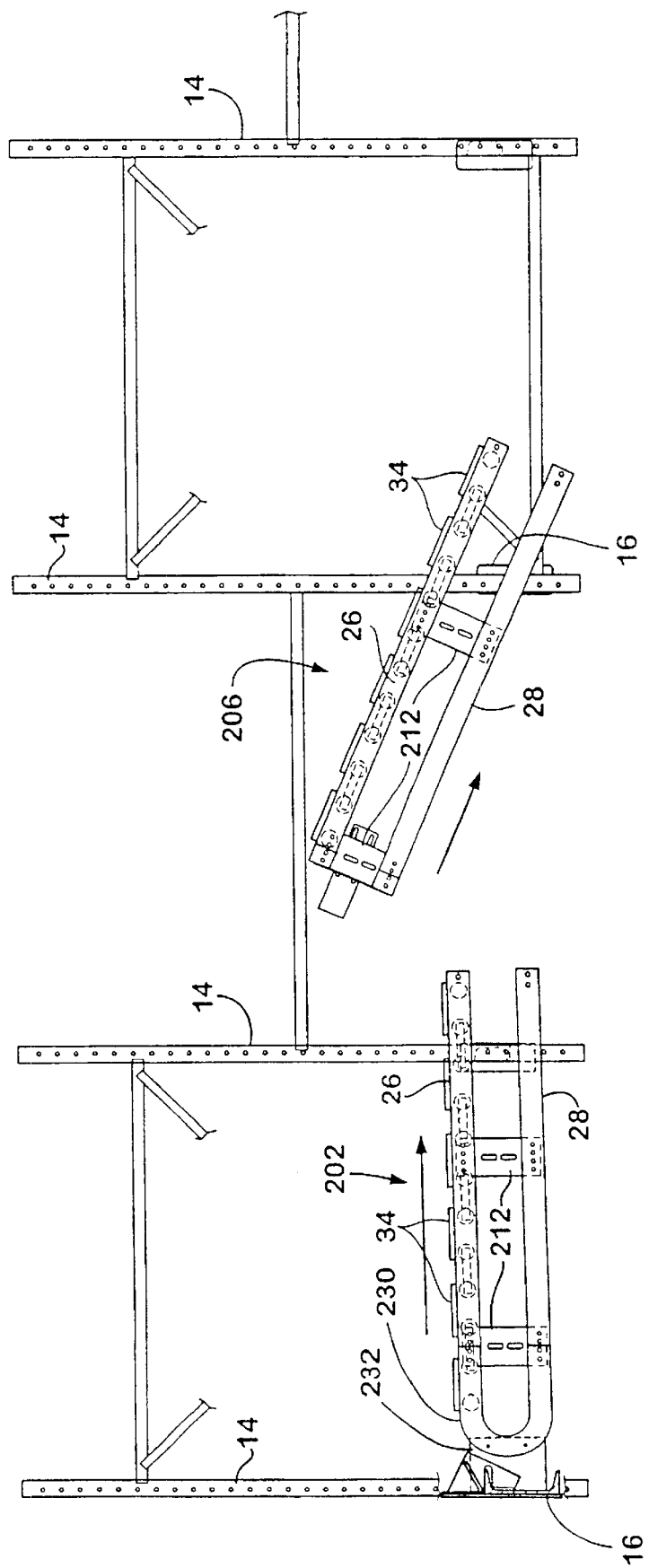

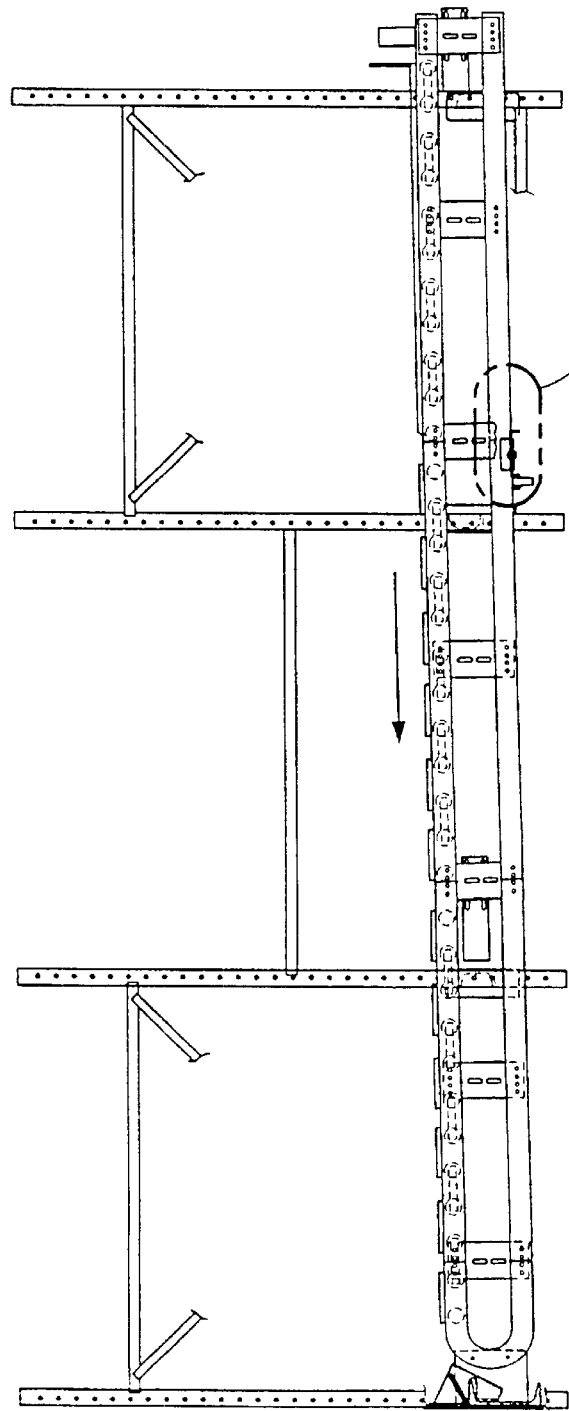
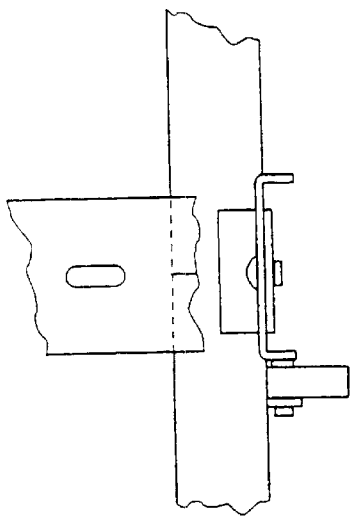
Fig. 44
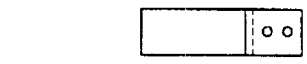
Fig. 38  Fig. 39
Fig. 40
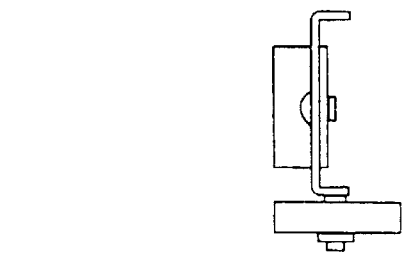
Fig. 42
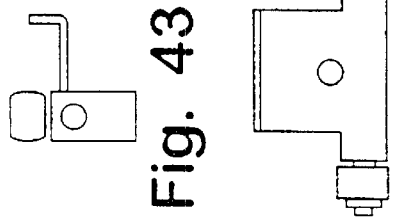
Fig. 43  Fig. 41

PUSH-BACK STORAGE RACK

CROSS-REFERENCES TO RELATED APPLICATIONS

This is a continuation in part application of co-pending U.S. patent application Ser. No. 08/388,634, now U.S. Pat. No. 6,112,915 entitled PUSH-BACK STORAGE RACK and filed on Feb. 14, 1995 by Lyman F. Lewis, the disclosure of which is incorporated here by reference.

STATEMENT REGARDING FEDERALLY SPONSORED RESEARCH OR DEVELOPMENT

Not Applicable.

BACKGROUND OF THE INVENTION

The present invention relates to push-back storage racks used in warehousing and more particularly to a push-back storage rack wherein moveable pallet carts are connected end-to-end and wrap around and fit under an upper storage rack.

Warehouse storage racks typically comprise a frame structure divided into rows and columns that define storage bays for depositing storage units (e.g., pallets) of products to be stored. In order to conserve space in a storage facility, storage bays are sometimes more than one pallet deep, and moveable carriages, called "push-back racks", are used to permit pallets to be moved to rearward storage locations from a single loading station at the front of the rack system. Most push-back racks employ overlying or nesting platforms that fit one on top of the other at the front storage compartment in the bay. As each platform is loaded and pushed rearwardly, the next platform is made available for the next pallet. Generally, the tracks on which the pallets are mounted are inclined forwardly so that gravity causes the pallets to slide or roll to the front of the storage bay. The track mechanisms and carts required for this type of push-back rack can be complex and expensive, and the system requires a different cart construction for each storage location in the bay. Moreover, the maximum storage unit depth of each bay is limited with stacking carts, and the stacking carts introduce height limitations into the bay.

BRIEF SUMMARY OF THE INVENTION

In accordance with the present invention, a push-back storage rack that provides a convenient and effective push-back rack system, comprises a frame defining at least one storage bay having a depth sufficient to accommodate a plurality of separate storage units; a track-mounted carriage assembly is mounted in the bay. The carriage assembly comprises at least two carts, each sized to hold separate pallets or other storage units. The carts are connected together end-to-end for pivotal movement about a transverse horizontal axis. The track on which the carts ride has an upper track section which guides the carts for movement between the front and the rear of the bay. The track also includes a forward section and a lower track section which direct the carts downwardly and then rearwardly in the bay in an inverted position as the carts move forwardly at the front end of the upper track section. The carts are thus stored underneath the upper track section and are brought upwardly to the upper track section for use as the rearmost carts on the upper track section are filled and moved rearwardly on the upper track section.

The preferred track of the present invention comprises opposed C-shaped track members at opposite sides of the storage bay, with the forward portion of the track section comprising an arcuate section that connects the upper and lower track sections. Other track constructions are possible.

The storage carts are wheeled carts that ride in the track, with each wheeled cart preferably comprising a plurality of separate wheeled cart sections connected together for pivotal movement about a horizontal transverse axis. Desirably, the individual cart sections also are articulated at an intermediate longitudinal point to provide even further bending ability for the cart sections.

The cart sections form a flat, stable platform for supporting pallets on the upper track section but bend easily around the arcuate forward track section for storage in an inverted position an out-of-the-way location underneath the upper track section.

The individual carts are connected together by a connecting mechanism that includes the axle for the wheels. The wheels are mounted on axles that fit through aligned sleeves that are connected to adjacent cart sections, thus permitting rotation of the wheels as well as pivotal movement of the carts with respect to each other.

The present invention provides a compact and cost effective push-back rack system with interchangeable components, no stacking cart height limitations, and virtually unlimited bay depth.

These and other features, objects, and benefits of the invention will be recognized by one having ordinary skill in the art, from the specification, the claims, and the drawing figures.

BRIEF DESCRIPTION OF THE SEVERAL VIEWS OF THE DRAWING

FIG. 6 is a plan view of one cart section of the present invention.

FIG. 28 is a front elevational view of a front guard.

FIG. 29 is a top plan view thereof.

FIG. 30 is a right end elevational view thereof.

FIG. 32 is the view of FIG. 30, showing the modular front curve section in final position.

FIG. 33 is a fragmentary, side elevational view of a storage rack, showing installation of a modular middle section into a storage bay.

FIG. 38 is the view of FIG. 36, showing installation of the bottom stop assembly.

FIG. 39 is a side elevational view of a back top stop bracket.

FIG. 40 is a front elevational view thereof.

FIG. 41 is a top plan view of a bottom stop assembly.

FIG. 42 is a side elevational view thereof.

FIG. 43 is an end elevational view thereof.

FIG. 44 is the fragmentary side elevational view detail XLIV of FIG. 38, showing the bottom stop assembly installed.

DETAILED DESCRIPTION OF THE INVENTION

Figure 1:
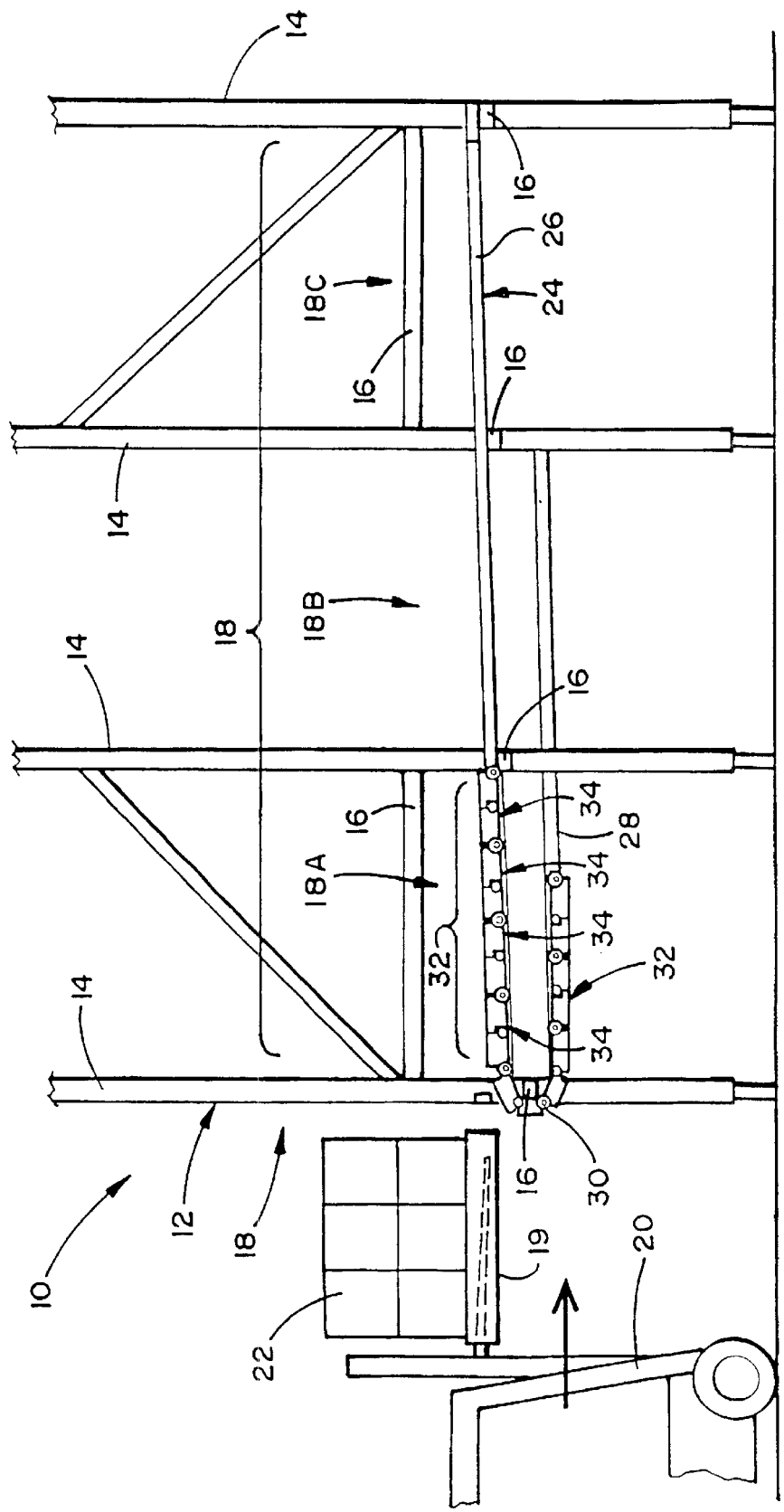
FIG. 1 is a side elevational view of a push-back rack system in accordance with the present invention.

Referring now to the drawings, an exemplary warehousing storage rack system 10, shown in FIG. 1, comprises a frame 12 consisting of spaced vertical columns 14 and horizontal beams 16 that define a series of vertically and horizontally spaced storage bays 18. A single storage bay 18 is shown in FIG. 1, with the storage bay comprising a front section 18A, a middle section 18B, and a rear section 18C. Each storage bay section is positioned one behind the other and is sized to accommodate a standard size of storage unit. The storage unit is commonly a pallet 19, which is loaded in the storage bay by a forklift truck 20, supports products or goods 22, and is generally known by one having ordinary skill in the art. A typical pallet is about forty inches (1016 mm) wide, about forty-eight inches (1219 mm) long, and about five inches (127 mm) tall.

A track 24 extends from a front to a rear of the frame 12, with the track having an upper section 26, a lower section 28, and a curved or arcuate front section 30 that connects the upper and lower sections of the track. A carriage mechanism consists of a plurality of wheeled carts 32 that are mounted end-to-end on the track 24, with each cart being subdivided into separate wheeled cart sections 34.

Figure 2:
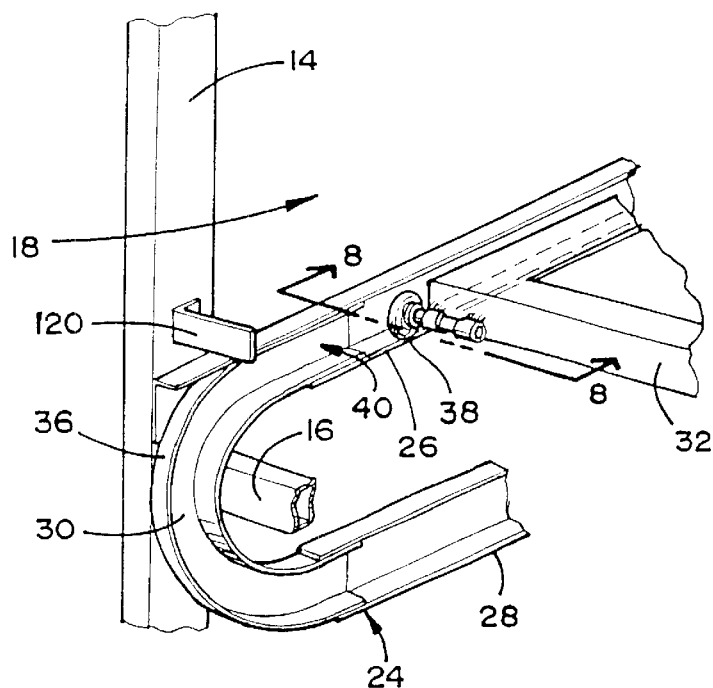
FIG. 2 is a fragmentary perspective view showing a forward corner of the track and cart system of the present invention.
Figure 3:
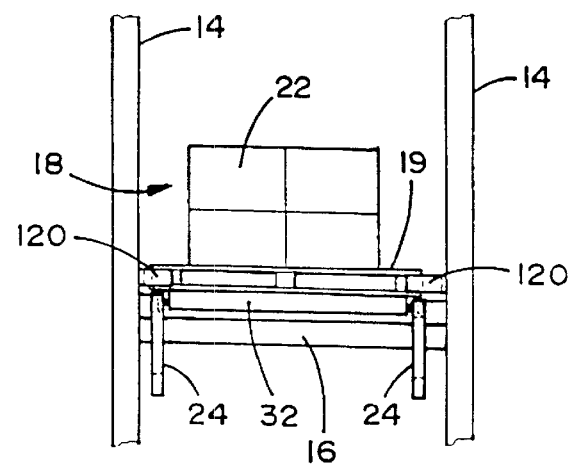
FIG. 3 is a front elevational view of the present invention, showing a pallet storage unit positioned on one of the carts of the present invention.

Referring to FIGS. 2 and 3, track 24 comprises separate track sections positioned at opposing sides of storage bay 18, with the tracks being supported on the columns 14 and separated from the columns by an about three inch (76 mm) square beam 16. Each track 24 comprises an inwardly facing C-shaped channel member 40 that has opposing, upper and lower flanges 36 desirably spaced about 3⅛ inches (79 mm) apart by a web portion. Carts 32 are provided with wheels 38 at the four corners thereof, with the wheels extending outwardly from the sides of the carts and riding in the channels 40 of the track 24.

Figure 10:
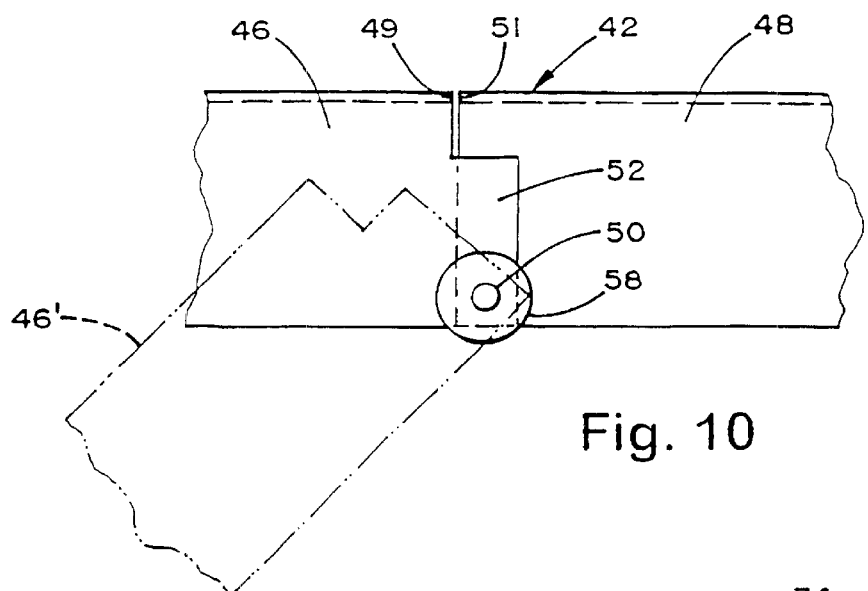
FIG. 10 is a fragmentary side elevational view of an intermediate portion of a cart section, showing the articulated side rails of the cart section.

The manner in which the carts 32 are constructed are shown in FIGS. 5–12. In the illustrated embodiment, each cart 32 comprises four cart sections 34, with each cart section comprising a rectangular frame that may be formed of about 2×2×⅛ inch (51×51×3 mm) angle iron, or the like, and that has opposing side rails 42, a rear member 44, and a front member 45. Side rails 42 may preferably be articulated, as shown in FIG. 10. A front side rail section 46 is pivotally connected to a rear side rail section 48 by means of a rivet or pivot pin 50. Pivot pin 50 extends outwardly from the side of the cart and has a wheel 58 rotatably mounted thereon. The wheel 58 may be a conventional, steel roller skate wheel as is commonly known. The wheel 58 engages the curved arcuate portion 30 of the track 24 and provides a low friction interface between the cart section 34 and the track. More preferably, the pivot pin 50 is provided at its end with a ball caster 56 (FIG. 19) to run along the web portion of the channel 40 and guide the cart section 34, as will be understood by one having ordinary skill in the art.

A top edge 49 (FIG. 10) of section 46 is recessed so that a forward edge of the side wall constitutes a flange 52 that overlaps the adjoining edge of side rail section 48. By constructing the side rails 42 in this manner, they articulate downward, as shown in phantom in FIG. 10, to allow the cart sections to "bend" when they roll around the arcuate front section 30 of the track 24. When the cart sections 34 are positioned in a horizontal position on the upper track 26, however, upper edge 49 on section 46 engages upper edge 51 on section 48 to prevent side rail 46 from pivoting upwardly with respect to side rail 48, beyond the horizontal position shown in FIG. 10. This also prevents the cart 32 from sagging under load when a storage unit, or pallet 19, is mounted on the cart.

The articulating side rails 42 are an important feature of the present invention because of the dimensions of the structure. In the preferred practice of the present invention, the distance between the upper and lower track sections 26 and 28, respectively, is minimized and desirably is about 11.5 inches (292 mm). The individual cart sections 34 are each about 11.25 inches (286 mm) long. Thus, it is necessary to articulate each of the individual cart sections 34 to facilitate the movement of the cart sections around the curved front portion 30 of the track 24, while minimizing the distance between the upper and lower track sections.

The manner in which the carts 32 and individual cart sections 34 are connected together is shown in FIGS. 6–9. Cart sections 34 and carts 32 are all connected in the same manner. An axle shaft 60, having a head 61 and a narrow outer end 64 of reduced diameter, fits through a plurality of tubular axle fittings 68 that are mounted on one of the carts 32 and a tubular axle fitting 68 mounted on another of the carts. Axle fittings 66 are spaced apart sufficiently that tubular fitting 68 fit between them. Axle shaft 60 fits through interior openings 70 in the axle fittings 66, when the fittings 66 and 68 are placed into alignment with each other. A spring C-clip or E-clip 72 fits in groove 74 in the axle shaft and holds the shaft in the axle fittings. Wheels 38 fit on narrower shaft 64 and are held in place by a nut or pin or the like 73 on the outer end of shaft 64. A grease fitting 76, such as a zerk nipple, mounted on the end of axle shaft 60 may be provided to supply grease through an interior opening 78 to grease outlets 80 and lubricate the axle shaft. The respective axle fittings are welded to the carriages.

The axle fixtures forming the hinge of the present invention desirably have a one inch (25 mm) outside diameter, a $9/16$ inch (14 mm) inside diameter, and are ½ inch (13 mm) long. The axle is a greasable axle ½ inch (13 mm) in diameter and 3½ inches (89 mm) in length. The wheels preferably are 1½ inches (38 mm) wide and 3 inches (76 mm) in diameter and may be formed of phenolic resin or may be a metal wheel with bearings (sometimes referred to as a skate wheel).

Figure 11:
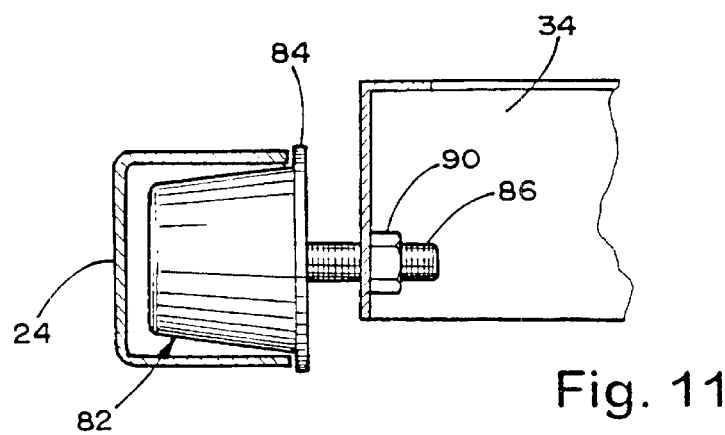
FIG. 11 is a fragmentary front sectional view showing a transverse alignment wheel on the cart riding in the track.
Figure 12:
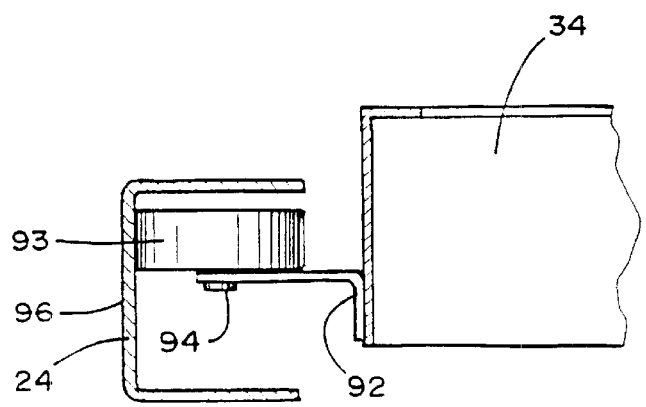
FIG. 12 is a fragmentary front sectional view showing an alternative embodiment of a transverse alignment wheel for maintaining proper transverse position of the carts.

Transverse movement of the carts from a side-to-side direction may be restricted by special transverse alignment wheels of the type shown in FIGS. 11 or 12. As shown in FIG. 11, wheel 82 is conical and tapered slightly inward as it extends outward, so it fits easily into track 24. The wheel desirably has a diameter of about 3 to 2¾ inches (about 76 to 70 mm) and a taper of about 7–9E. The wheel also has a flange 84 extending radially greater than the distance between the upper and lower surfaces of the track 24 (preferably the flange diameter is about 3½ inches [89 mm]), providing an inward limit that the wheel may extend into the track. This restricts lateral movement of the cart 32. Desirably, the axle 86 of the wheel is threaded and is received in a threaded opening 90 in the cart. The lateral position of the alignment wheel thus may be adjusted.

Another embodiment of an alignment device is shown in FIG. 12. An angle fixture 92 is mounted to the side of the cart section with a horizontal wheel 93 mounted on a vertical axle 94 on flange 92. The wheel 93 engages the outer wall or web 96 of channel 40 and constrains lateral movement of the cart section 34.

Figure 13:
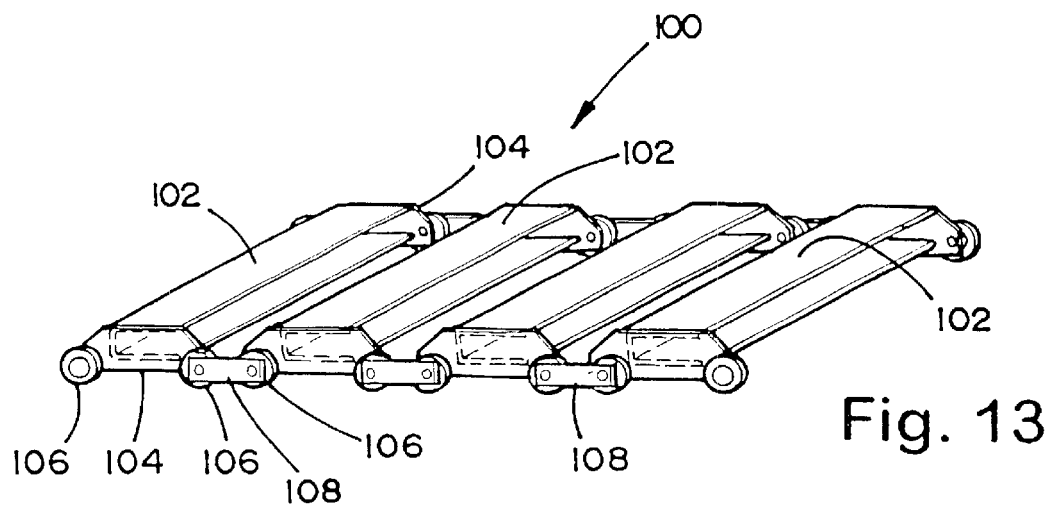
FIG. 13 is a perspective view of an alternative embodiment of the cart system of the present invention.
Figure 14:
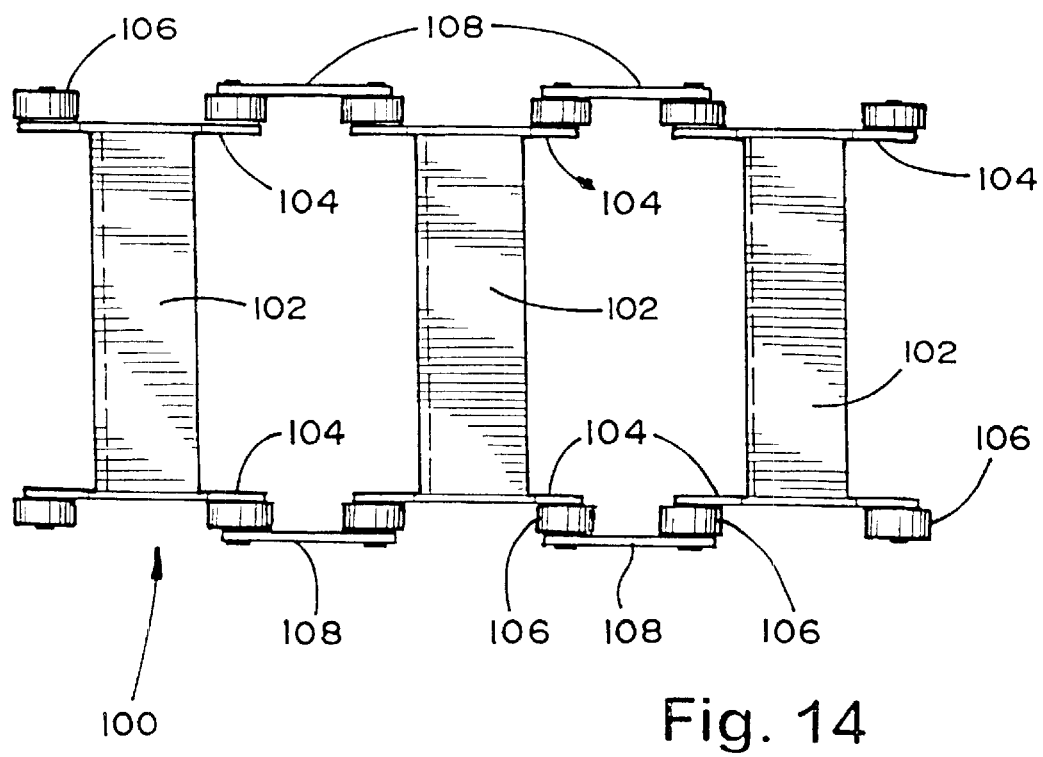
FIG. 14 is a plan view of the cart system of FIG. 13.
Figure 15:
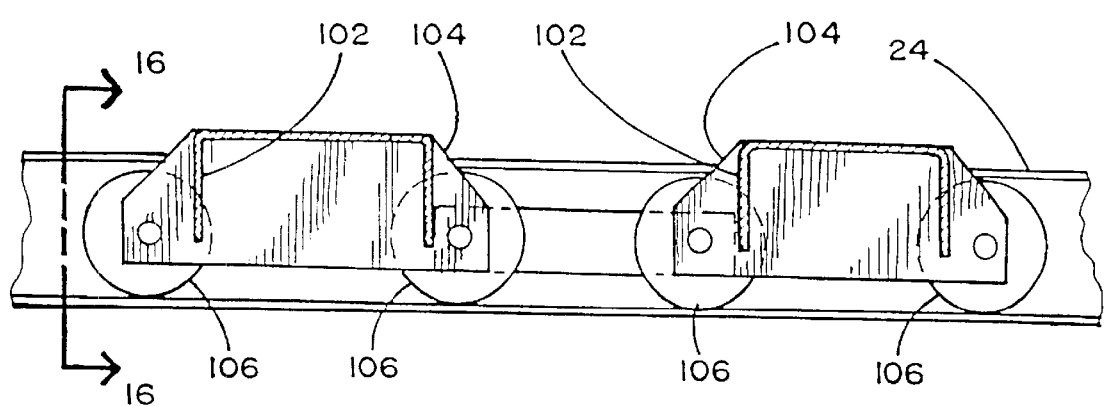
FIG. 15 is a side elevational view of a portion of the cart system of FIG. 13, showing the wheels of the cart system riding in a section of track.
Figure 16:
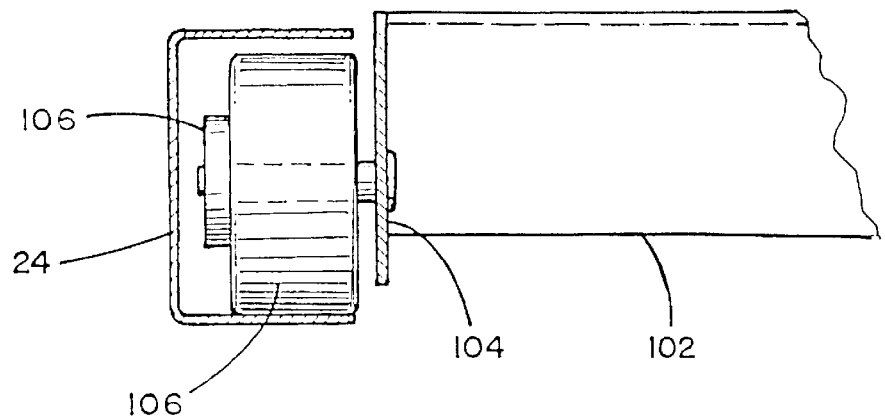
FIG. 16 is a sectional view taken along line 16—16 of FIG. 15.

Another embodiment of the cart of the present invention is shown in FIG. 13. Cart 100 comprises a plurality of longitudinally spaced C-shaped cross beams 102, which are mounted to plates 104 at each end thereof. Plates 104 have wheels 106 mounted thereon. Links 108 interconnect the adjacent wheels on each cross beam. Links 108 permit relative pivotal movement of the respective cross beams. The same type of lateral alignment mechanism described above and shown in FIGS. 11 and 12 can be employed with this embodiment of the invention.

Figure 4:
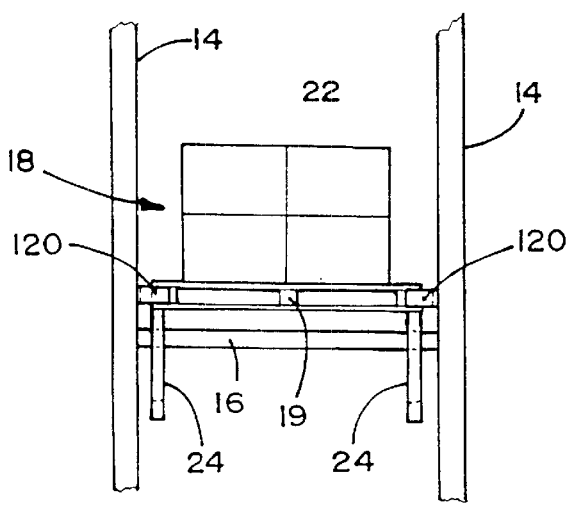
FIG. 4 is a front elevational view similar to FIG. 3, wherein a final pallet rests on the rails of the track system.
Figure 5:
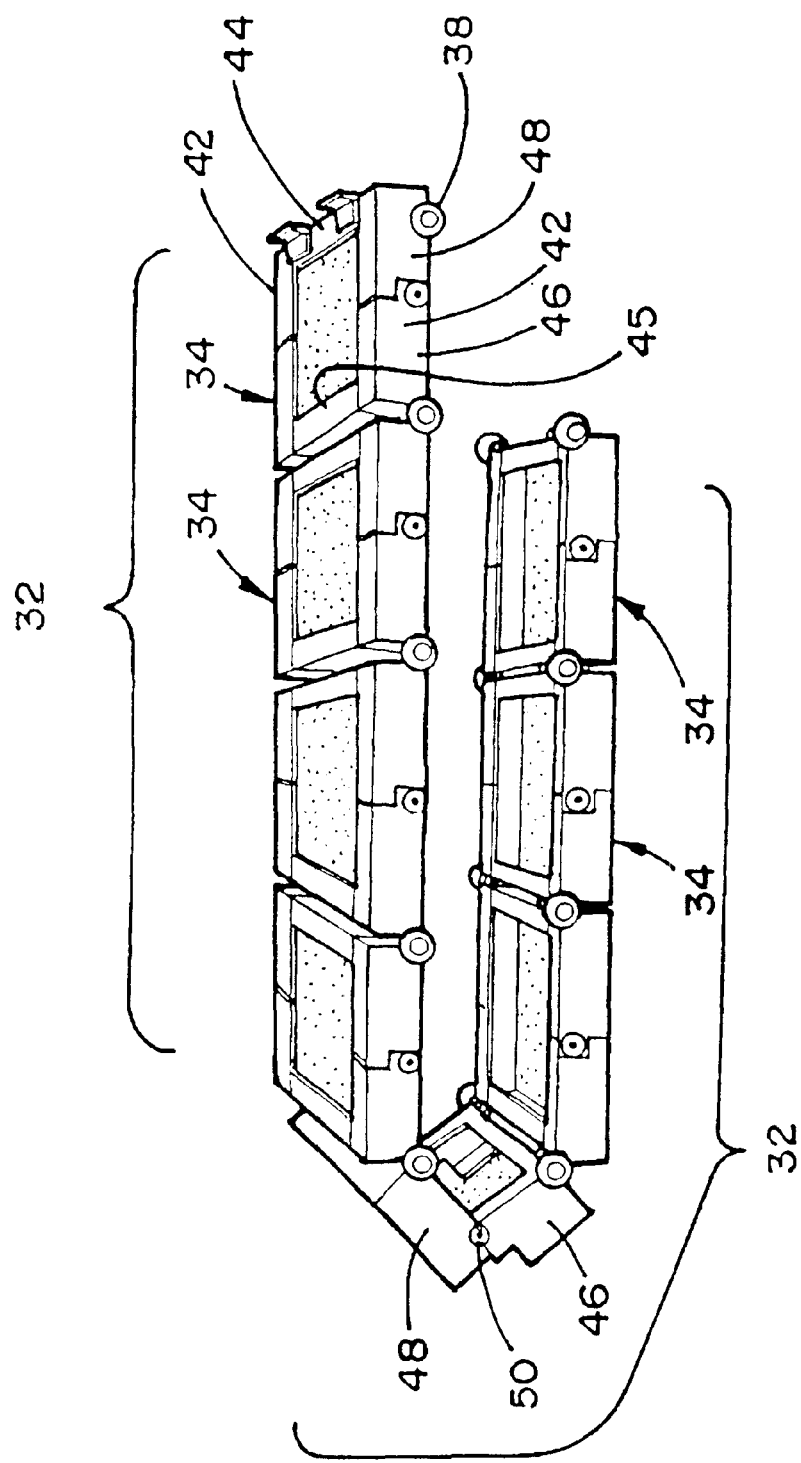
FIG. 5 is a perspective view showing the wheeled carts of the present invention.
Figure 8:
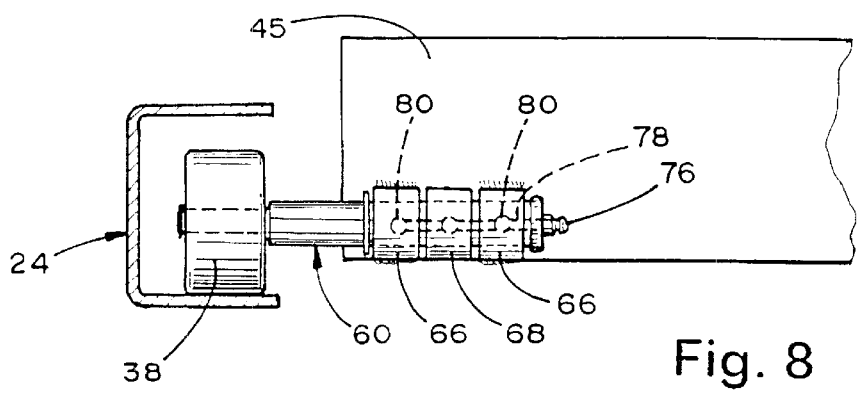
FIG. 8 is a fragmentary sectional view taken along lines 8—8 of FIG. 2, showing the manner in which two carts or cart sections are connected together.
Figure 9:
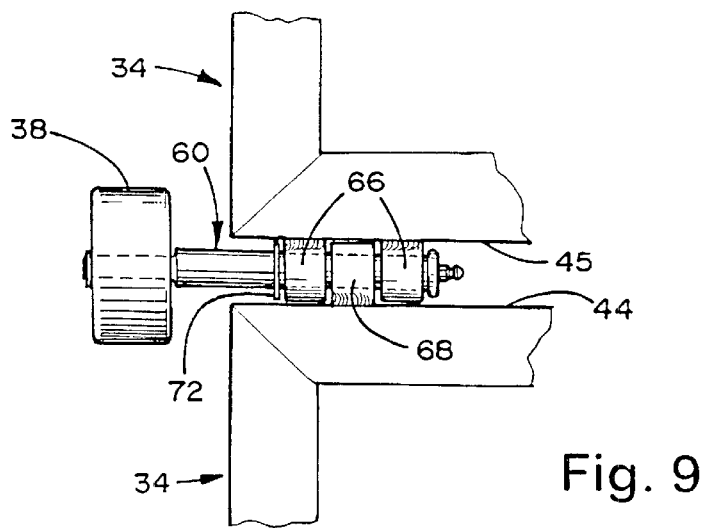
FIG. 9 is a fragmentary plan view showing the cart connection mechanism of FIG. 7 in an assembled condition.
Figure 7:
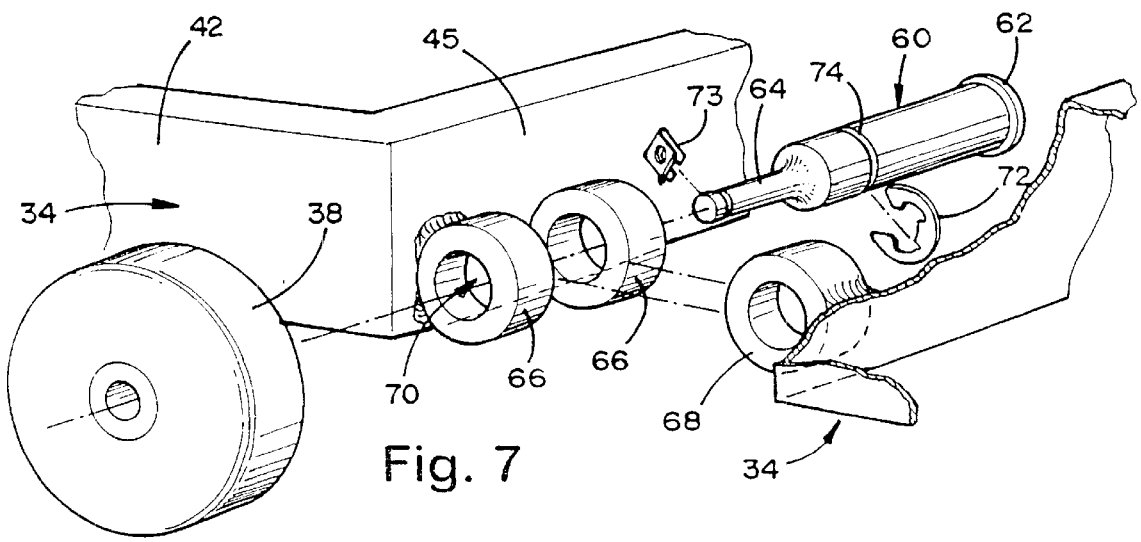
FIG. 7 is an exploded perspective view showing the manner in which two carts or two cart sections are connected together.
Figure 18:
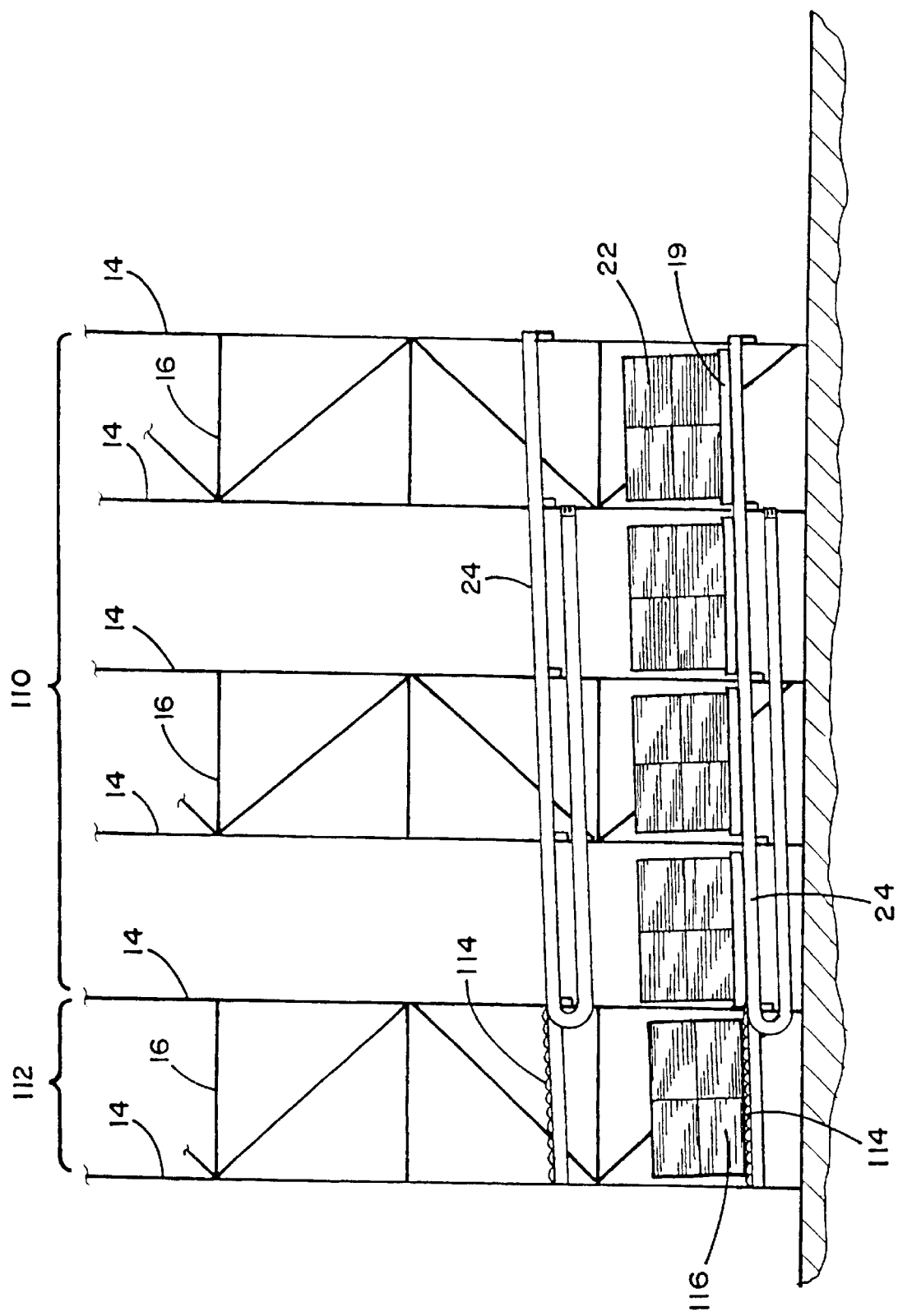
FIG. 18 is an alternative embodiment showing the use of a separate pallet loading station at the front of the push-back rack system of the present invention.

A modified embodiment of the present invention is shown in FIG. 18. In FIG. 18, the push-back rack structure 110, shown in the right hand portion of the figure, is substantially the same as the rack structure described above, with the exception that an additional storage compartment is provided in each bay, each bay being four storage units deep. To accommodate four storage units, it is necessary that the carriage or cart train be three carts long. After the three carts are moved to the rear, a final pallet can be placed on the rails themselves, as shown in FIG. 4.

An additional feature of the embodiment of FIG. 18 is that an additional rack section 112 is positioned at the front of the rack and is provided with a series of rollers 114. This makes it possible to load a pallet 116 on section 112 and thereafter push the pallet onto the roll back rack. With the extra section 112 at the front of the rack, this rack can store pallets in a single bay to a depth of five pallets. Also as shown in the FIG. 18 embodiment, storage bays can be positioned one above the other to any desired height.

While storage mechanisms employing two and three cart units are shown in the present invention, an advantage of the present system is that almost any number of carts can be employed in the rack system.

Figure 17A:
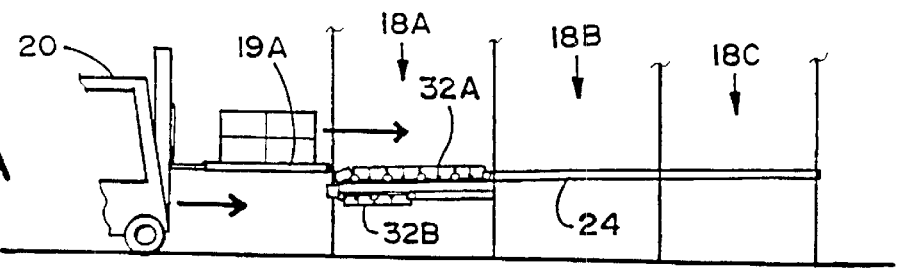
FIGS. 17A–17D are schematic drawings showing the manner in which the present invention is used for loading multiple pallets in a storage bay.

The operation of the present invention is shown in FIG. 17A–D for an exemplary system using a bay that is three units deep. In FIG. 17A, a pallet 19A is placed on cart 32A. A stop plate 120 (shown in FIGS. 2, 3 and 4) prevents the loaded pallet from rolling under the influence of gravity out through the open end of the bay after the forklift truck has been removed. Stop plate is a right angle plate spaced about one inch above the carriage assembly. The stop plate is about three inches high and has a three inch long flange attached to column A and a 4½ to 7 inch long stop flange that extends over the track and into the path of the pallet.

Figure 17B:
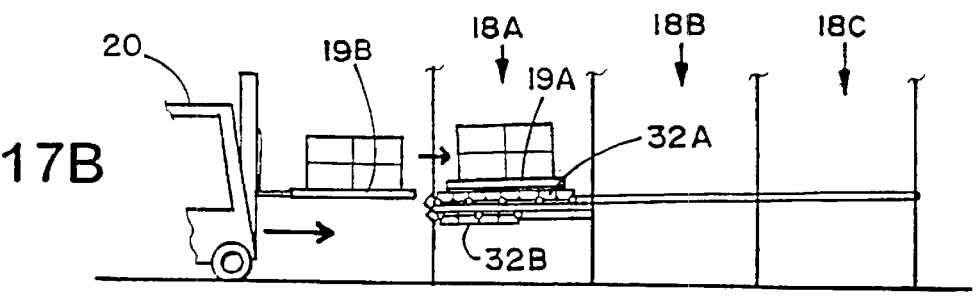
Figure 17C:
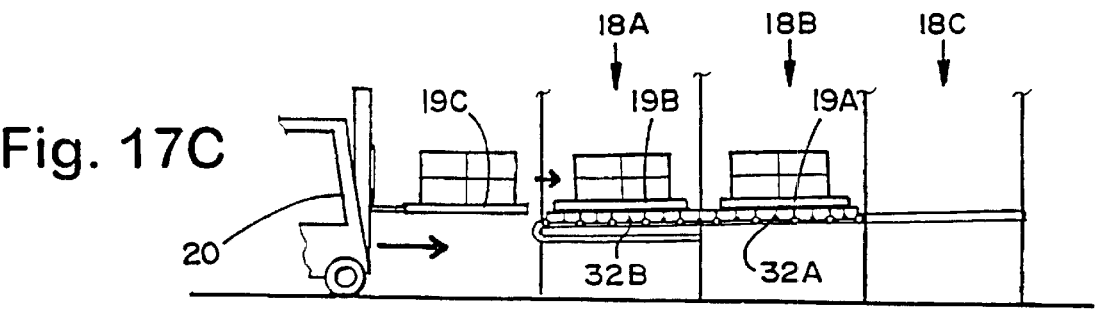
Figure 17D:
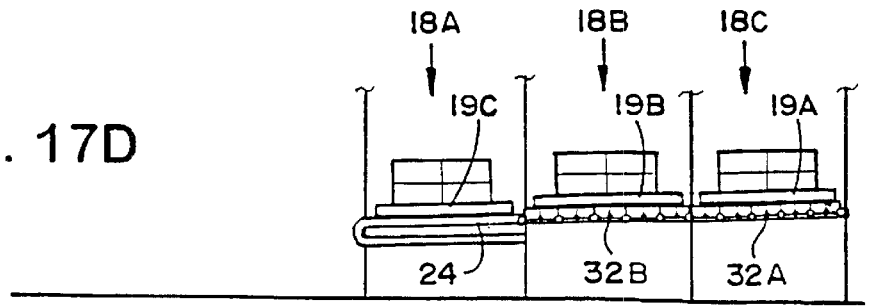

As shown in FIG. 17B, when pallet 19B is pressed against pallet 19A, pallet 19A rolls along with cart 32A to section 18B of the storage rack bay. Similarly, as shown in FIG. 17C, when pallet 19C is pushed against pallet 19B, all of the pallets slide inwardly one station further, so that (as shown in FIG. 17D) pallet 19A and cart 32A are in section 18C of the bay. Similarly, pallet 19C and cart 32B are in section 18B of the bay. Finally, pallet 1 9C sits on the rail 24 in section 18A of the bay. Stop 120 prevents any of the pallets from sliding outwardly unless lifted over the stop. The reverse operation is accomplished in removing the pallets from the rack, with gravity causing the cart to roll forwardly as each pallet at the front of the rack is removed. Desirably, the track is inclined at an inclination of one inch (25.4 mm) per four feet (1219 mm) of rack length.

In the present invention, a simple C-channel track can be used to support and guide the carts. This track can be formed in uniform sections of 8 feet in length or so, with each section being cut to size and bolted together as desired. Thus, only straight sections of uniform track and the curved front portion of the track need to be prefabricated.

Figure 19:
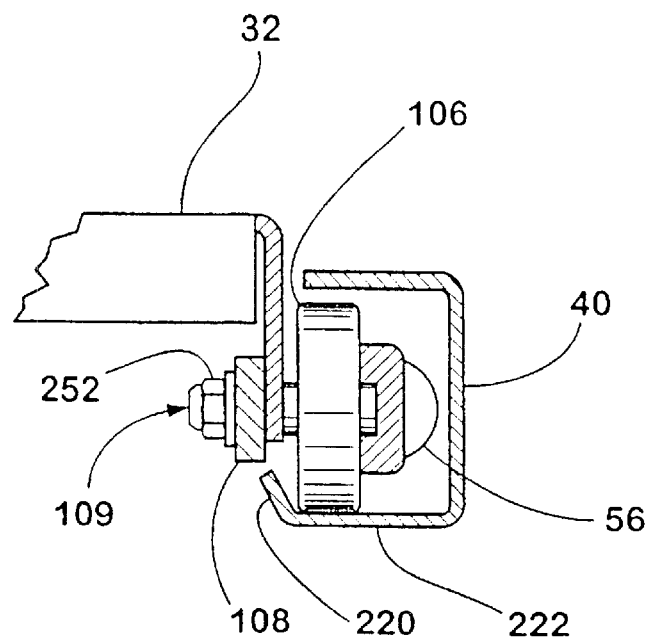
FIG. 19 is the view of FIG. 16 in mirror image and showing an alternative wheel, arrangement.
Figure 22:
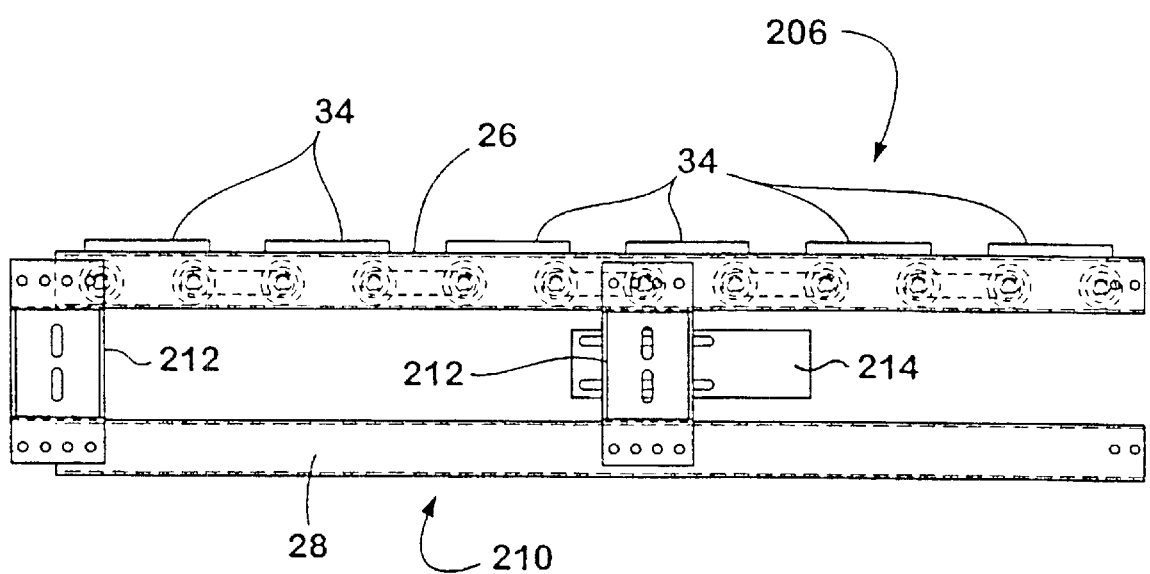
FIG. 22 it is a side elevational view along section line XXII—XXII of FIG. 20.
Figure 20:
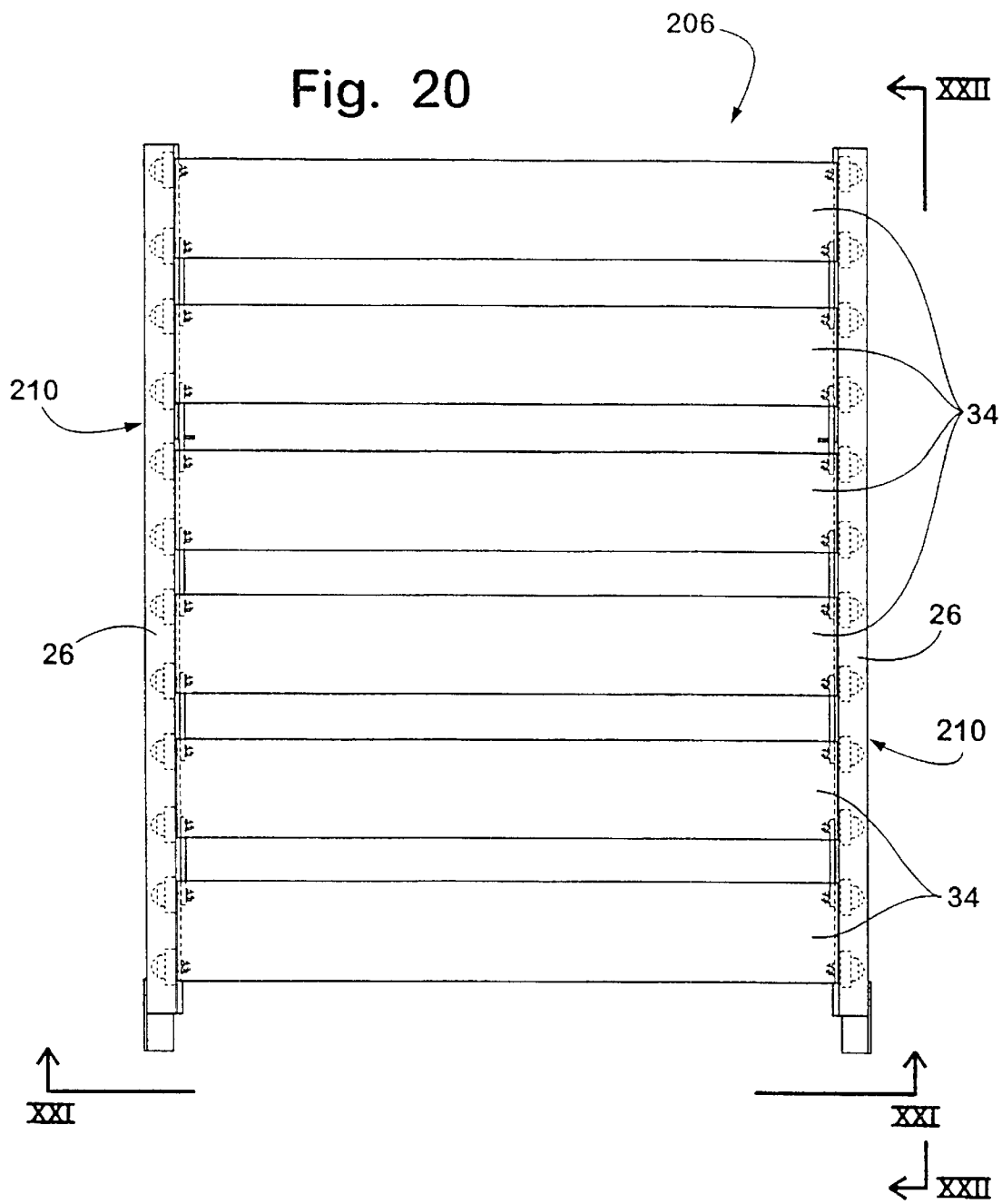
FIG. 20 as a top plan view of a modular rack track middle section.
Figure 21:
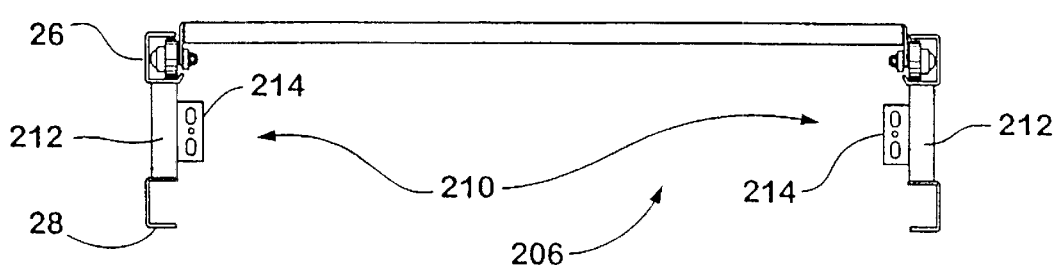
FIG. 21 is an end elevational view along section line XXI—XXI of FIG. 20.
Figure 26:
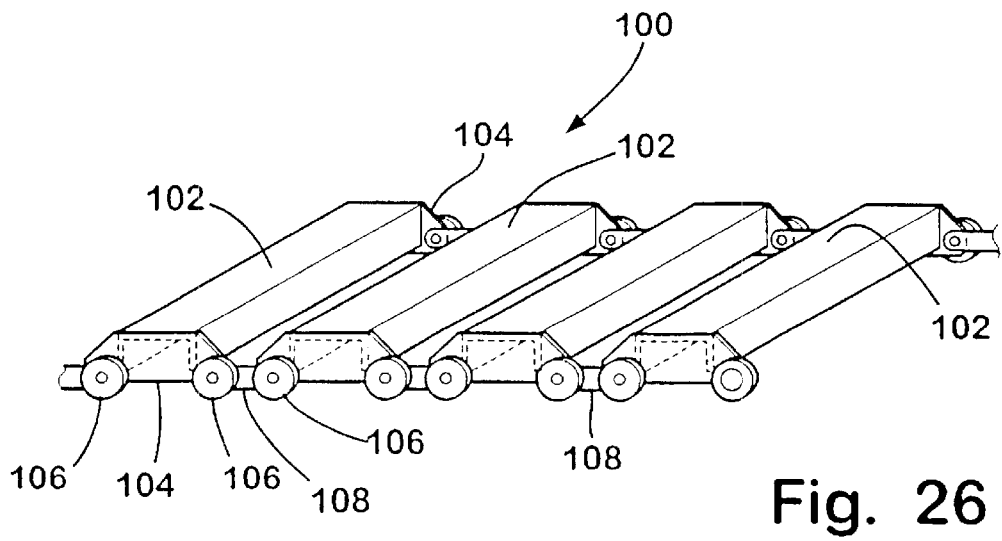
FIG. 26 is the view of FIG. 13, showing an alternative positioning of the cart section links.
Figure 27:
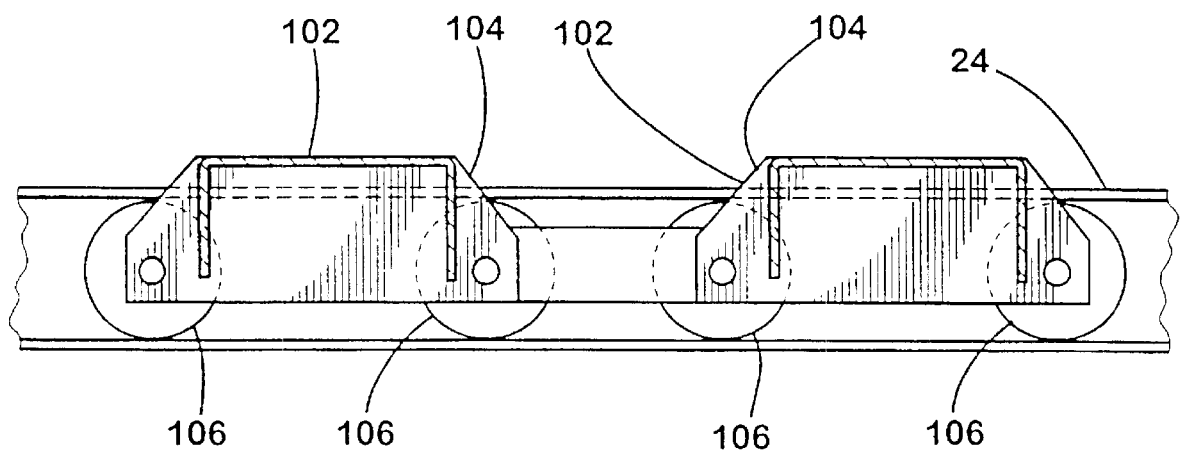
FIG. 27 is the view of FIG. 15, showing the alternative positioning of the cart section links of FIG. 26.

In another embodiment of the invention, the push back storage rack system may be configured as a modular system having a front curve section 202, an end section 204, and as many middle sections 206 as are required or desired. This embodiment not only includes the modular configuration, it also incorporates a relocation of the cart interconnecting links 108 to an inboard position on the wheel axle 109 (FIGS. 19, 26, and 27).

The modular middle section 206 is assembled with opposing, mirror image track assemblies 210 that have upper and lower track sections 26 and 28, respectively, spaced apart, about the width of the carts 32, and facing one another. A set of cart sections 34 are positioned in and extend along the length of the upper track section 26. The upper and lower track sections 26 and 28, respectively, are preassembled with generally vertical structural brackets 212 that hold the upper and lower track sections generally parallel with one another. The vertical structural brackets 212 may also have an inwardly extending flange member 214 that is slidably connected, preferably with the rearward vertical structural bracket, to fasten the modular rack section to a structural cross beam 16 of the rack system frame 12, as will be understood by one having ordinary skill in the art. Most preferably, the upper and lower track sections 26 and 28, respectively, are a generally G-shaped modification (FIG. 19) of the C-channel 40, discussed further above, with an upward turned flange 220 on the lower leg 222. The flange 220 is useful to maintain the wheels 106 in the channel and minimize any potential for the wheels to drift out of the track channel.

The modular front curve section 202 is substantially similar to the modular middle section 206, with mirror image track assemblies 210 having upper and lower track sections 26 and 28, respectively, a set of cart sections 34 positioned in and extending along the upper track section, the upper and lower track sections been assembled with a generally vertical structural brackets 212, and the upper and lower track sections being G-shaped. The modular front curve section 202 is, however, distinguished from the modular middle section 206 by a curve portion 230 that extends from the upper track section 26 to the lower track section 28, connecting the upper and lower track sections for transfer of the cart sections 34 between them. The curve portion 230 also has a forward mounting plate to connect with the first horizontal load beam 16 or vertical column 14 of the rack frame 12.

As to the modular end section 204, it is also substantially similar to the modular middle section 206, with the same track assemblies 210 and the generally G-shaped track sections. The modular end section 204 is different from the modular middle section 206, however, because of the use of a single cart 240 that is positioned in and extends along the upper track section, rather than a set of cart sections 34 as is used for each of the modular front curve section 230 and the modular middle section 206. The single cart 240 of the modular end section generally conforms to the storage unit, pallet 19, in width and length. The single cart 240 of the modular end section 204 is advantageous in positioning the push back storage rack system in an empty condition. That is, in addition to the stops and guards, the single cart 240 will not traverse around the curve portion 230 of the modular front curve section 202, and will remain in position in the upper track section 26 of the modular front curve section, standing ready to receive a pallet for storage.

Figure 31:
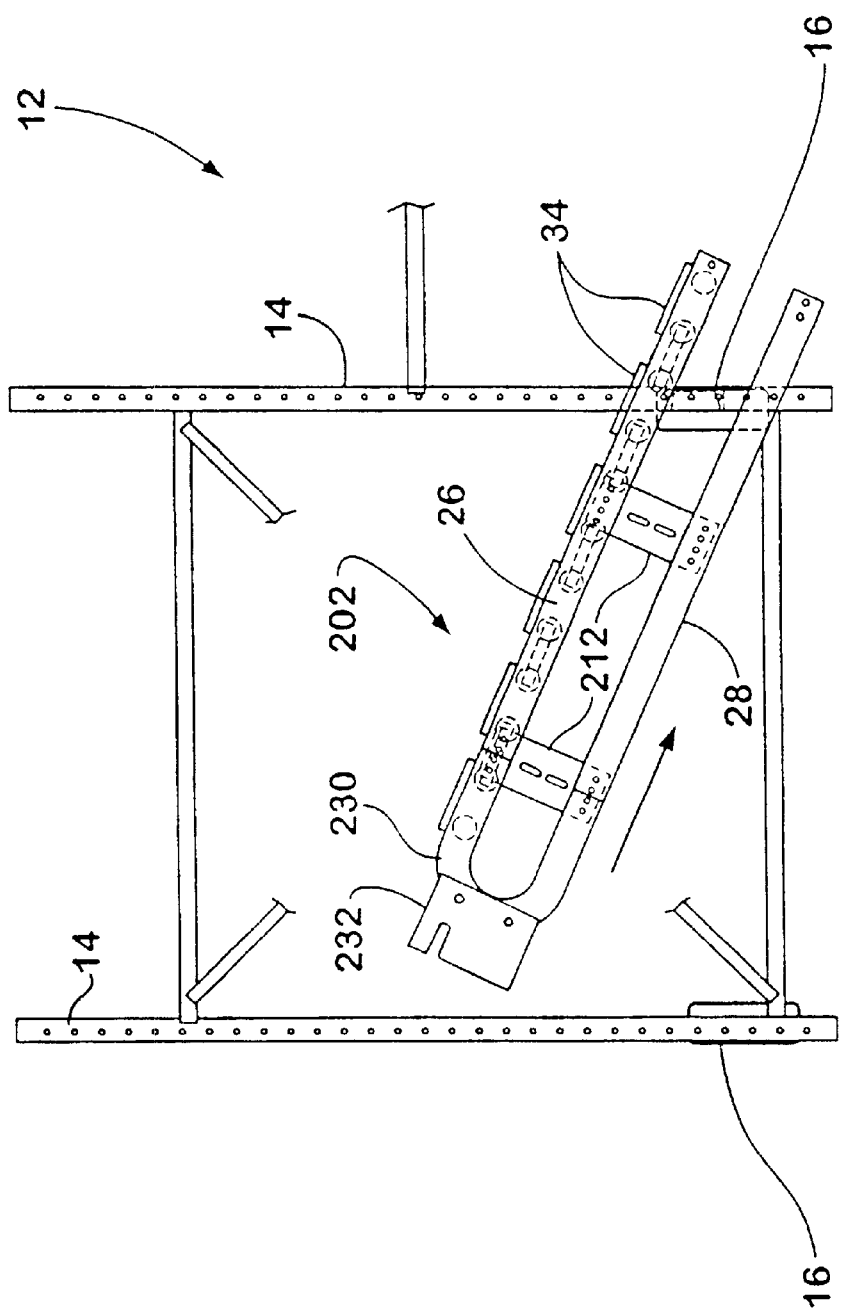
FIG. 31 is a fragmentary, side elevational view of a storage rack, showing installation of a modular front curve section into a storage bay.

In use, the modular push back storage rack system is installed into a storage rack frame 12 with the modular front curve section 202 being installed first (FIGS. 31 and 32). The modular section 202 is positioned in a front or first portion 18A of a storage bay 18 and the second load beam 16 of the rack frame 12 is positioned between the back ends of the upper and lower track sections 26 and 28, respectively. The modular front curve section 202 is slid reward so the front of the section and the mounting plate 232 clears the rack frame 12 and is positioned for secure attachment to the first or front load beam 16 at the front of the rack frame 12. With the modular front curve section 202 so positioned, left hand 242, center 244, and right hand 246 stops and a front guard 248 (FIGS. 28–30) are mounted at the front load beam 16 for holding a pallet 19, for example, in a ready positioned for retrieval or push back by another pallet that is added to the storage bay 18.

Figure 34:
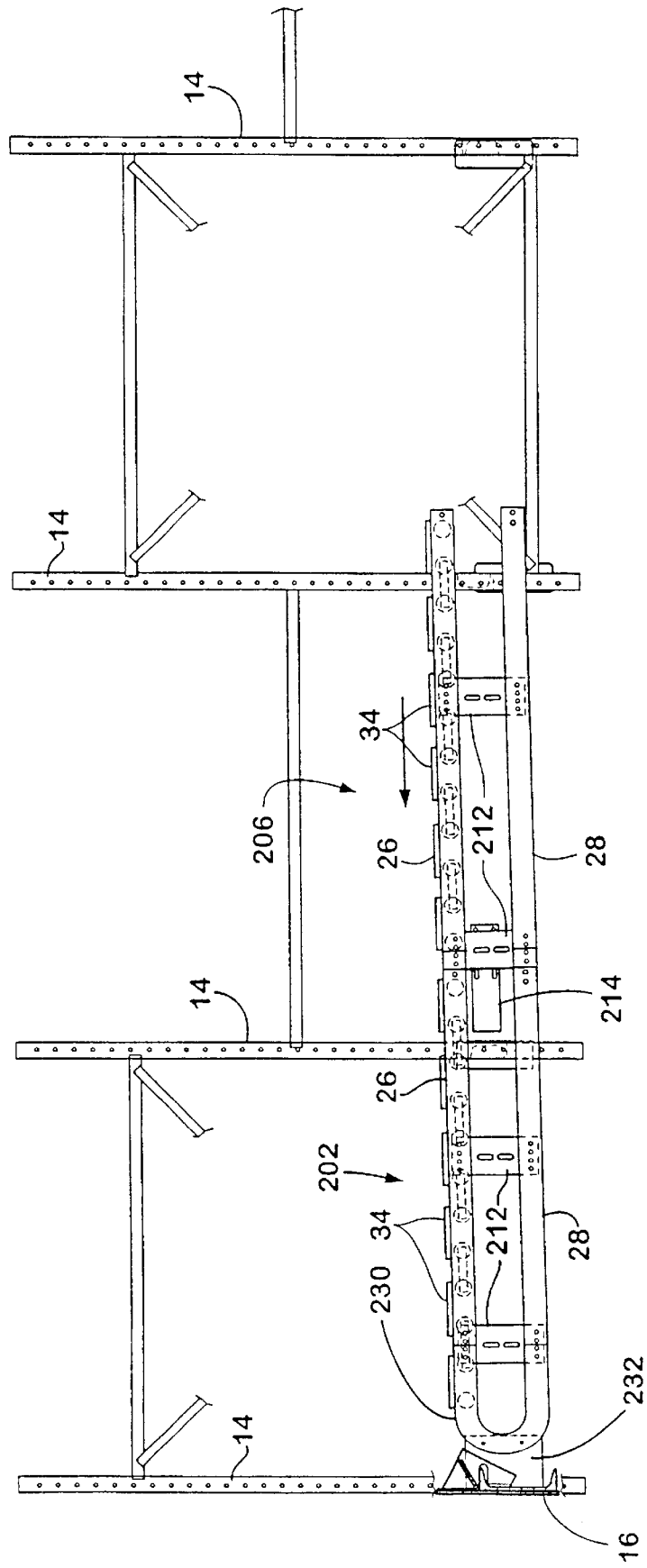
FIG. 34 is the view of FIG. 33, showing the modular middle section in final position.
Figure 35:
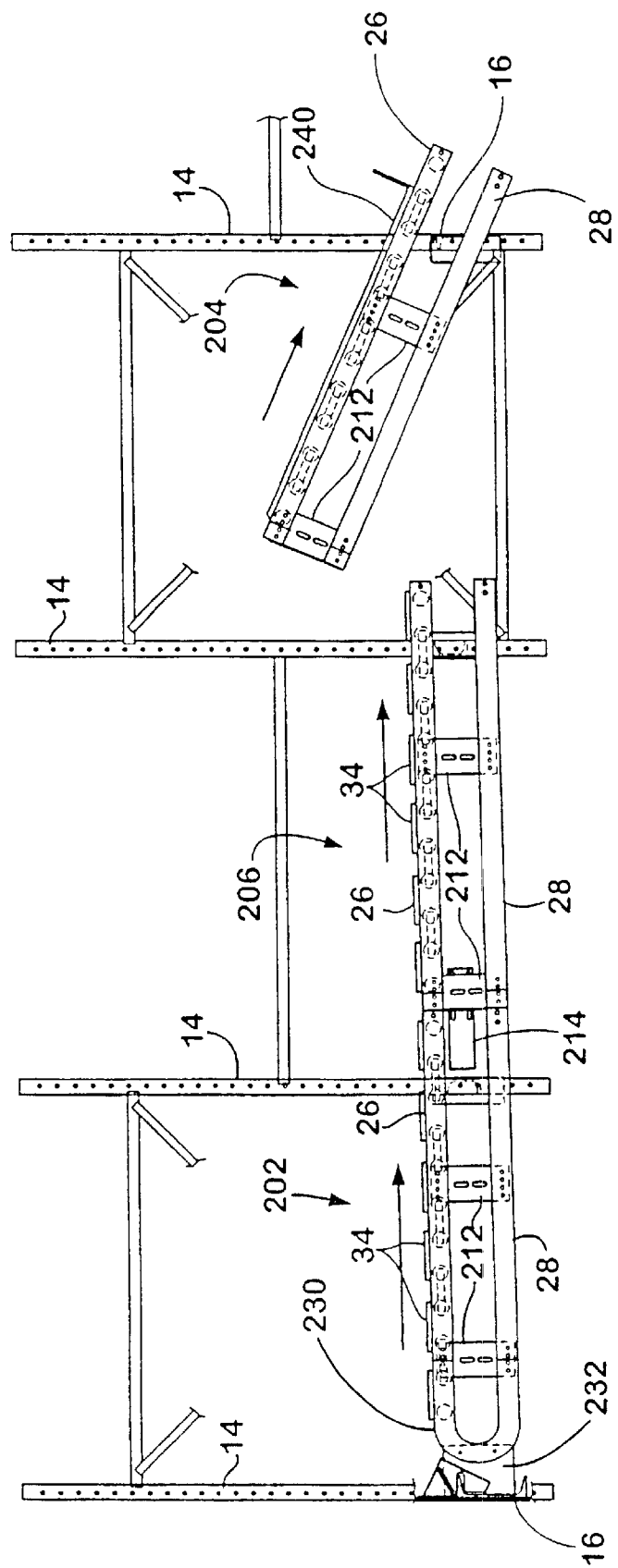
FIG. 35 is the view of FIG. 33, showing installation of a modular end section into the storage bay.
Figure 36:
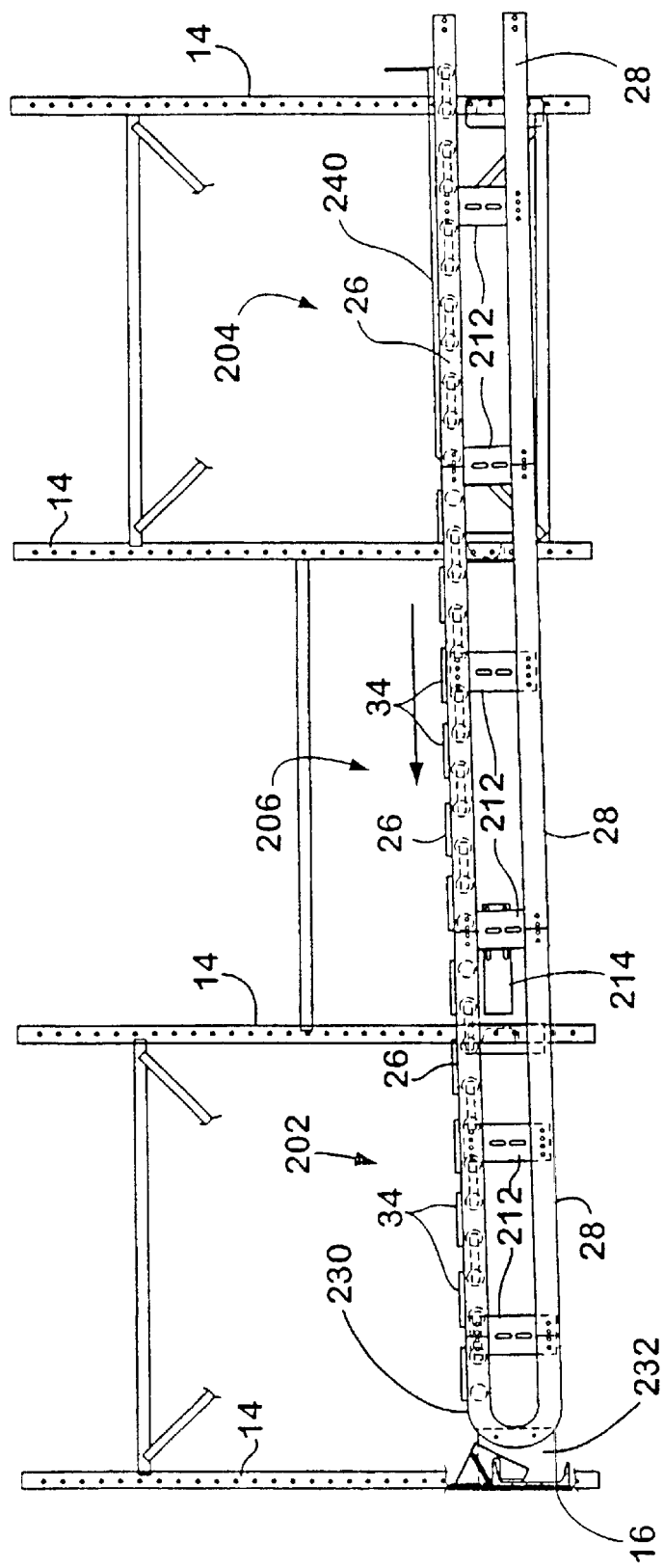
FIG. 36 is the view of FIG. 35, showing the modular end section in final position.

The modular middle section 206 is similarly positioned in a second portion 18B of the rack frame 12, behind of the modular front curve section 202, by positioning the next, or third load beam 16 between the back ends of the upper and lower track sections 26 and 28, respectively, and positioning the front of the modular middle section in coupling engagement with the back of the modular front curve section (FIGS. 33 and 34). The modular front curve and middle sections 202 and 206, respectively, are interconnected with eight ¼-20 screws. As many of the modular middle sections 206 as are desired are sequentially connected, as just described, up to the last portion of the storage bay 18. A modular end section 204 is then installed in the last portion of the storage bay 18, in substantially the same manner that each of the modular middle sections 206 is installed (FIGS. 35–36). Again, the only significant, distinguishing feature of the modular end section 204 as compared to the modular middle section 206 is the use of a single cart 240 that extends along the length of the section 204 as opposed to a set of cart sections 34 that extend along the length of the section.

Figure 37:
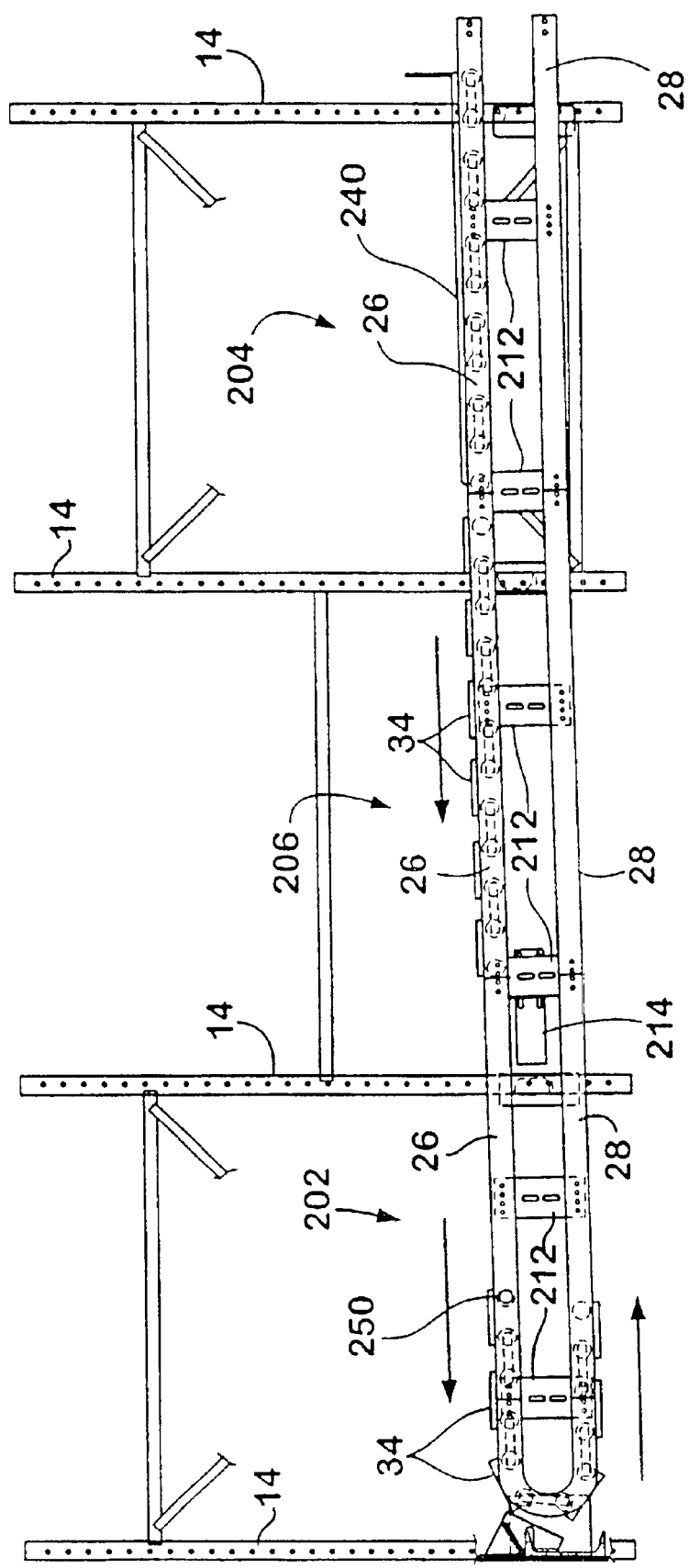
FIG. 37 is the view of FIG. 36, showing connection of the modular sections.

With each of the modular curve, middle, and end sections 202, 206, and 204, respectively, installed in the rack frame 12, adjoining carts 32 or 240 are interconnected by use of an access hole 250 (FIG. 37) that is positioned about mid-way along the upper track section 26 of the modular front curve section 204. The last wheel 106 of a cart 32 is aligned with the access hole 250 so a link 108 (FIGS. 19 and 37) that extends forward from the next cart 32 or 240 may engage the axle 109 of that last wheel 106 and be secured with a nut 252, preferably a cap nut or lock nut, by access to the wheel axle through the access hole 250 and to the nut 252 under the cart 32 (see FIG. 19).

In addition to the stops and guards described above, a bottom stop (FIGS. 38 and 41–44) may also be installed on the lower track section 28 at a location one pallet position in or forward from the rear of the unit. The bottom stop will, therefore, be positioned near the back end of the last modular middle section 206, before the modular end section 204. Also, a back, top stop bracket (FIGS. 38–40) may be installed at the back of the upper track section 26 of the modular end section 204 to keep the carts 32 and 240 from being pushed out the back of the upper track section 26.

Figure 23:
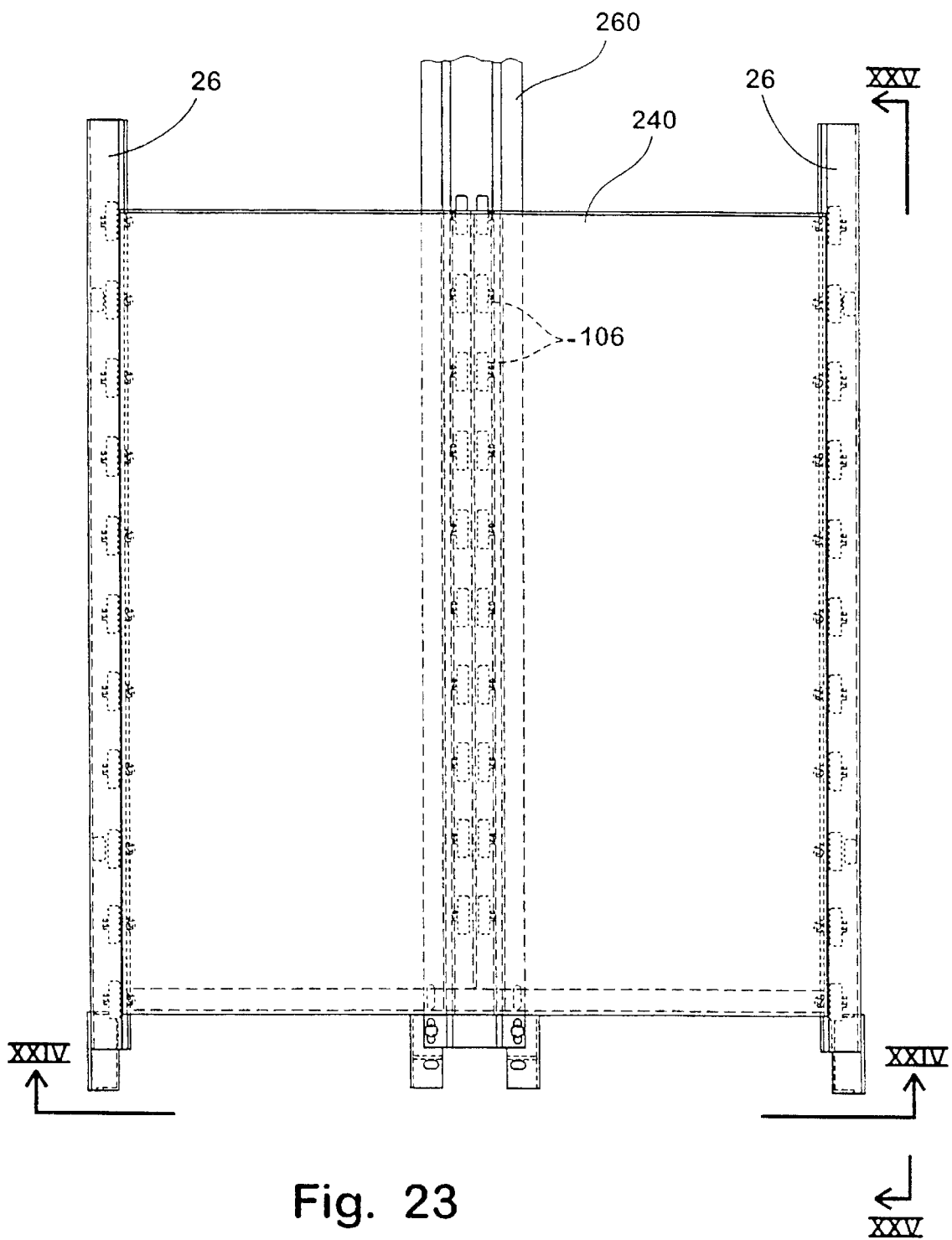
FIG. 23 is the view of FIG. 20, showing a strengthened modular rack track end section.
Figure 24:
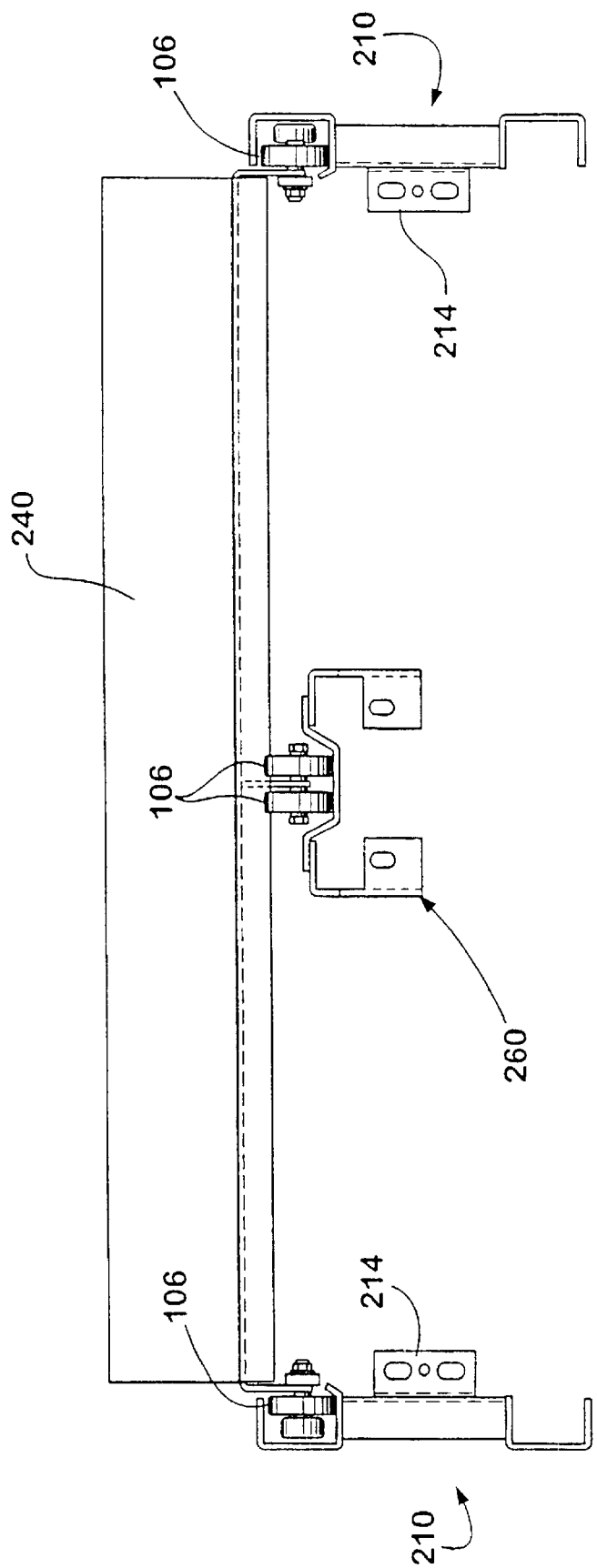
FIG. 24 is an end elevational view along section line XXIV—XXIV of FIG. 23.
Figure 25:
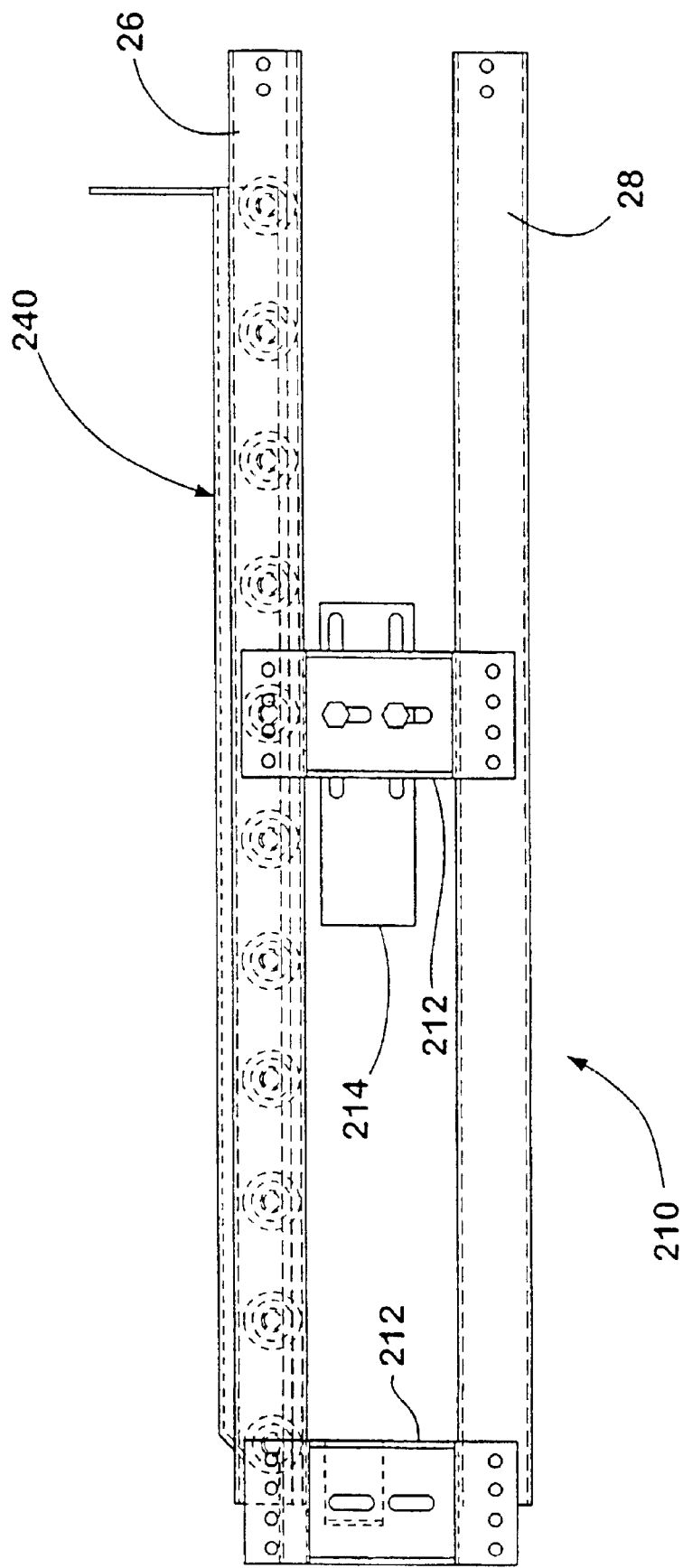
FIG. 25 it is a side elevational view along section line XXV—XXV of FIG. 23.

Optionally, a center track 260 (FIGS. 23–25) may be installed between the upper track sections 26 of the modular front curve, modular middle, and modular end sections 202, 206, and 204, respectively, for rack storage systems that are required to carry extra heavy loads. In the optional, extra heavy load installation, each cart 32 and the singular cart 240 of the modular end section 204 will also be provided with center support wheels 106 to engage and run on the center track 260.

It should be understood that the foregoing is merely exemplary of the preferred practice of the present invention and that various changes and modifications may be made in the arrangements and details of construction of the embodiments disclosed herein without departing from the spirit and scope of the present invention, as defined in the appended claims.

I Claim:

1. A push-back storage rack for storing individual storage units comprising:

a frame defining at least one storage bay having a depth sufficient to accommodate a plurality of separate storage units;

a track-mounted carriage assembly mounted in the bay, the carriage assembly comprising a plurality of longitudinally spaced storage unit support elements mounted on wheels and connected together end-to-end for pivotal movement about a transverse horizontal axis, the support elements being interconnected by non-collapsible connectors, such that when a rearward support element is pushed toward a forward support element, the spacing between the support elements is maintained as the rearward support element pushes the forward support element forward; and a track that movably supports and guides the support elements, the track being formed and mounted so as to guide the support elements for movement between a front and a rear portion of the bay on an upper track section, and to direct at least a forwardmost support element downwardly and then rearwardly in the bay in an inverted position on a lower track section as the support elements are moved forwardly at a front end of the upper track section, the forwardmost support element thereafter being pulled forwardly and then upwardly to the upper track section as a rearmost support element is pushed rearwardly on the upper track section, the upper and lower sections including wheel support surfaces positioned under the wheels for vertical support thereof, the upper and lower track sections being interconnected by a front section, the front section constraining movement of the support elements to a generally arcuate path between the wheel support surfaces of the upper and lower track sections when the support elements traverse forwardly and downwardly from the front of the upper track section to the front of the lower track section, the front section having inner and outer portions, the inner portion engaging inner sides of the support elements, the outer portion engaging outer sides of the support elements at sufficient positions along the front section to cause the support elements to remain in substantial engagement with the inner portion of the track front section and not move forwardly off the track when the support elements are pushed forwardly through the front section by rearward support elements as the support elements travel forwardly from the upper section to the lower section.

2. A push-back storage rack according to claim 1 wherein the track comprises opposed side sections on opposite sides of the bay, each side section including a generally straight upper section and an arcuate front section that extends between the upper and lower track sections.

3. A push-back rack according to claim 2 wherein the upper track section comprises inwardly facing C-shaped channel members in which the wheels fit.

4. A push-back rack according to claim 3 wherein the upper track section comprises upwardly and inwardly extending wheel retaining flanges on lower inside edges of the C-shaped channel members.

5. A push-back rack according to claim 1 wherein the upper section of track is inclined downwardly and forwardly toward the front of the bay, such that gravity urges the support elements and storage units thereon to move toward the front of the bay on the upper track.

6. A push-back rack according to claim 1 wherein each support element comprises one or more transverse support beams having wheels mounted at opposite ends thereof, the wheels riding on sections of the track at each end of the beams, the beams being pivotally interconnected for movement in a vertical plane by longitudinal links that interconnect the beams.

7. A push-back storage rack for storing individual storage units comprising:

a frame defining at least one storage bay having a depth sufficient to accommodate a plurality of separate storage units;

a generally U-shaped track mounted in the storage bay, the track including upper and lower track sections mounted one above the other and having a front member that provides an arcuate carriage path between front ends of the upper and lower sections of track, the track being formed in modules of predetermined size, each module including a length of upper and lower track and a bracket interconnecting them, the modules including a front section that also includes a U-shaped front member, the track including means for mounting and interconnecting the sections of the track;

a carriage assembly mounted on the track, the carriage assembly comprising a plurality of individual support elements mounted on the track by track contact elements for each support element, the support elements being connected together for pivotal movement about a transverse horizontal axis, the carriage assembly being guided by the track such that as individual support elements move forwardly on the upper track section and reach the front of the track, the support elements move downwardly to the lower track section and then move rearwardly on the lower track section in an inverted position, the lower track section serving to support and store support element sections until they are needed for use.

8. A push-back storage rack according to claim 7 wherein:

the support elements comprise transverse beams mounted on wheels at opposite ends of the beams, the support elements being connected together by pivot links; and the track comprises rails at opposite sides of the storage bay on which the wheels of the support elements ride, the rails being formed to support the support elements in upright and inverted positions on the upper and lower track sections and to guide the support element sections between inverted and upright positions as they traverse between the upper and lower track section.

9. A push-back rack according to claim 8 wherein the transverse beams are mounted on mounting plates at opposite ends thereof and the wheels are mounted on the mounting plates, the pivot links interconnecting the mounting plates.

10. A push-back storage rack according to claim 9 wherein a fixed position rack is positioned adjacent to and forward of the front section of the track, such that a storage unit can be positioned on the fixed position rack before it is pushed on the carriage assembly.

11. A push-back storage rack according to claim 10 wherein the fixed position rack includes rollers to facilitate storage unit movement thereon.

12. A push-back storage rack according to claim 7 wherein the upper track section is inclined downwardly and forwardly such that storage units positioned thereon are urged to gravitate toward the front of the storage bay, the storage rack including stop members that engage storage units to prevent the storage units from moving off the front of the storage rack.

13. A push-back storage rack according to claim 8 wherein upper surfaces of the beams support storage units when the support element sections are in their upright positions, the upper surfaces being positioned above the track such that storage units can extend laterally to a position above the track without engaging the track.

14. A push-back storage rack according to claim 7 wherein the front section of track extends downwardly in a curved path from the front end of the upper track section to the front end of the lower track section.

15. A push-back storage rack for storing individual storage units comprising:
   a frame defining at least one storage bay having a depth sufficient to accommodate a plurality of separate storage units;
   a track comprising:
      an upper track section mounted in the frame and extending from a front end at the front of the storage bay to a rear portion of the storage bay over a distance of at least two separate storage units, the upper track section defining a path for carriage sections to travel from the front of the storage bay to the rear portion of the upper track;
      a lower track section mounted in the frame below the upper track section and extending from a front to a rear portion of the storage bay;
      a front member defining a carriage path between the front ends of the upper and lower sections;
   a carriage assembly mounted on the track, the carriage assembly comprising a plurality of carriage sections movably mounted on the track by track contact elements for the carriage sections, each carriage section including a storage unit support surface, the carriage sections being connected together for pivotal movement about a transverse horizontal axis, the carriage assembly being guided by the track such that as individual carriage sections move forwardly on the upper track section from the rear portion to the front thereof and reach the front of the upper track, the carriage sections move downwardly to the lower track section and then move rearwardly on the lower track section in an inverted position, the lower track section serving to support and store carriage sections until they are needed for use.

16. A push-back storage rack according to claim 15 wherein the carriage sections comprise a pair of laterally spaced wheels that support opposite sides of the same storage unit support surface.

17. A push-back storage rack according to claim 16 wherein the track comprises laterally spaced track sections at opposite sides of the storage bay on which the wheels of the carriage sections ride, the track sections being formed to support the carriage sections in upright and inverted positions on the upper and lower track sections and to guide the carriage sections between inverted and upright positions as they traverse between the upper and lower track sections and rearwardly to the rear portions of the tracks.

18. A push-back rack according to claim 17 wherein the carriage sections comprise transverse beams mounted on wheels at opposite ends of the beams, the carriage sections being connected together by pivot links, the transverse beams being connected to mounting plates at opposite ends thereof and the wheels being mounted on the mounting plates, the pivot links interconnecting the mounting plates.

19. A push-back rack according to claim 17 wherein the push back rack further includes an intermediate track between the track sections at the sides of the storage bay, with wheels mounted on intermediate positions on the beam riding in the intermediate track.

20. A push-back rack according to claim 15 wherein the track contact elements of carriage sections comprise wheels and the track includes flanges that are located in a supporting position under the wheels in both the upper and lower track sections.

21. A push-back rack according to claim 15 wherein the carriage assembly has a front end and a back end and the two ends are not contiguous.

22. A push-back rack according to claim 15 wherein the carriage sections in the assembly can traverse from the upper to the lower track sections only over the front of the track.

\* \* \* \* \*